US008827289B2

(12) United States Patent  
Dilworth et al.

(10) Patent No.: US 8,827,289 B2  
(45) Date of Patent: Sep. 9, 2014

(54) REDUCED WEIGHT AXLE MOUNTING ASSEMBLY FOR VEHICLE SUSPENSION SYSTEMS

(71) Applicant: Hendrickson USA, L.L.C., Itasca, IL (US)

(72) Inventors: Damon Elwood Dilworth, Channahon, IL (US); Michael Paul Bloink, Naperville, IL (US); Ashley Thomas Dudding, Woodridge, IL (US); Sammy C. Lumetta, Naperville, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 13/839,651

(22) Filed: Mar. 15, 2013

(65) Prior Publication Data

US 2014/0035250 A1 Feb. 6, 2014

Related U.S. Application Data

(60) Provisional application No. 61/680,125, filed on Aug. 6, 2012.

(51) Int. Cl.
*B60G 3/08* (2006.01)
(52) U.S. Cl.
USPC ............................. 280/124.111; 280/124.175
(58) Field of Classification Search
USPC ...................... 280/124.11, 124.111, 124.128, 280/124.132, 124.153, 124.17, 124.175
See application file for complete search history.

(56) References Cited

U.S. PATENT DOCUMENTS

| 3,151,854 | A | 10/1964 | Felburn |
| 3,154,300 | A | 10/1964 | Wenzel |
| 3,251,608 | A | 5/1966 | Raidel |
| 3,386,724 | A | 6/1968 | Tantlinger et al. |
| 5,470,096 | A | 11/1995 | Baxter |
| 5,921,570 | A | 7/1999 | Lie |
| 5,950,971 | A * | 9/1999 | Koumbis et al. ............. 248/200 |
| 6,264,231 | B1 * | 7/2001 | Scully .......................... 280/680 |
| 7,540,514 | B2 * | 6/2009 | Westnedge ............. 280/124.116 |
| 8,136,825 | B2 * | 3/2012 | Luna ....................... 280/124.175 |
| 8,196,943 | B2 * | 6/2012 | Batdorff ................. 280/124.175 |
| 2003/0111143 | A1 | 6/2003 | Wheeler, Jr. |
| 2011/0017014 | A1 | 1/2011 | Batdorff |

FOREIGN PATENT DOCUMENTS

| EP | 1 446 244 B1 | 7/2007 |
| GB | 15059 | 0/1906 |
| JP | 9-113341 | 2/1997 |
| WO | WO 03/035295 A1 | 5/2003 |
| WO | WO 2011/109011 A1 | 9/2011 |

* cited by examiner

*Primary Examiner* — Faye M. Fleming
(74) *Attorney, Agent, or Firm* — Cook Alex Ltd.

(57) ABSTRACT

An axle mounting assembly for coupling a vehicle axle to an energy storing suspension component. The assembly includes a mounting pad, and a longitudinally extending energy storing suspension component such as a leaf spring is vertically aligned with respect to the mounting pad. An axle seat bracket is vertically aligned with and spaced from the mounting pad. The axle is transversely mounted to the axle seat bracket which includes at least one horizontally aligned open passage that is aligned parallel to the axle and which receives a U-shaped fastener assembly for coupling the axle and axle seat bracket to the mounting pad.

38 Claims, 24 Drawing Sheets

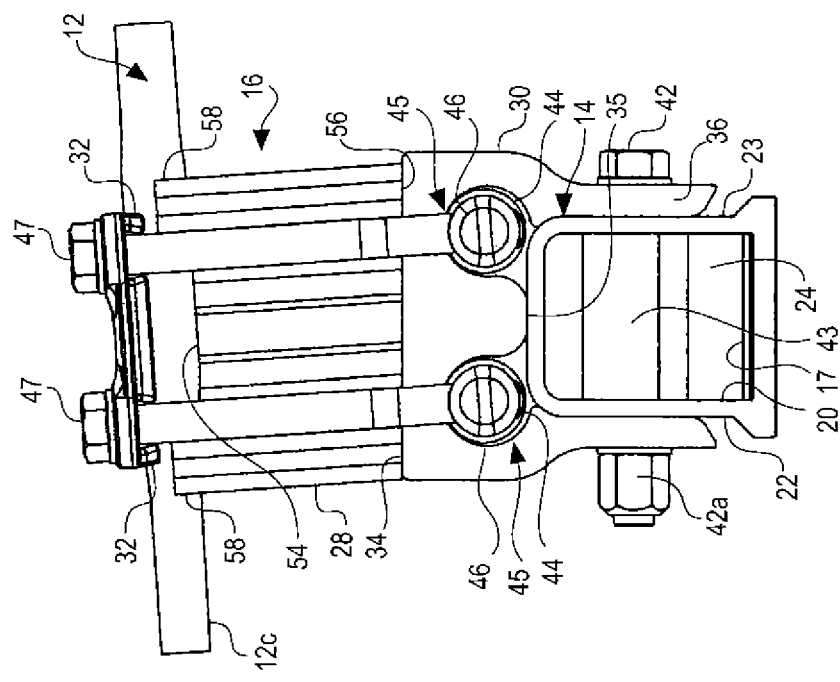
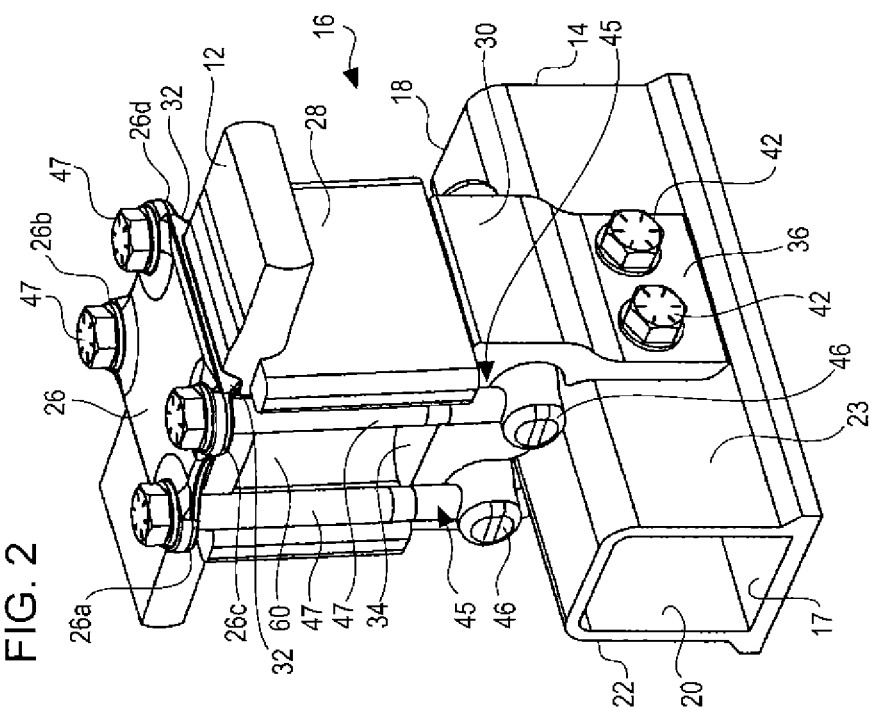

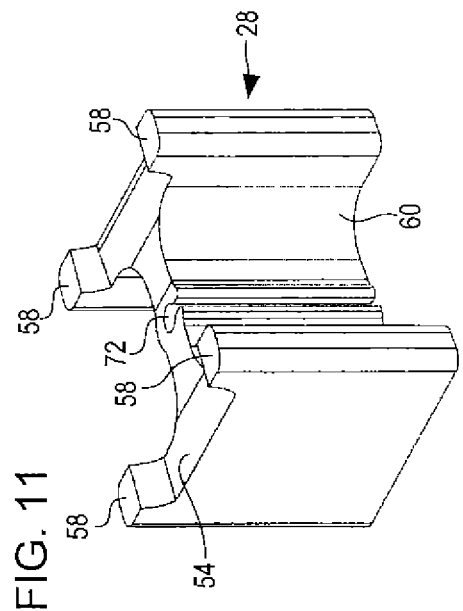
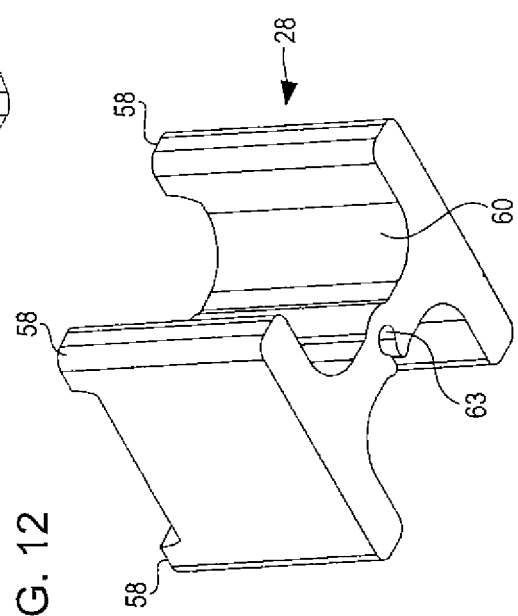
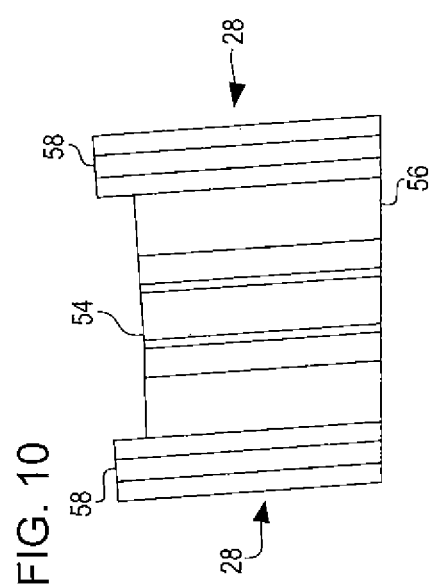

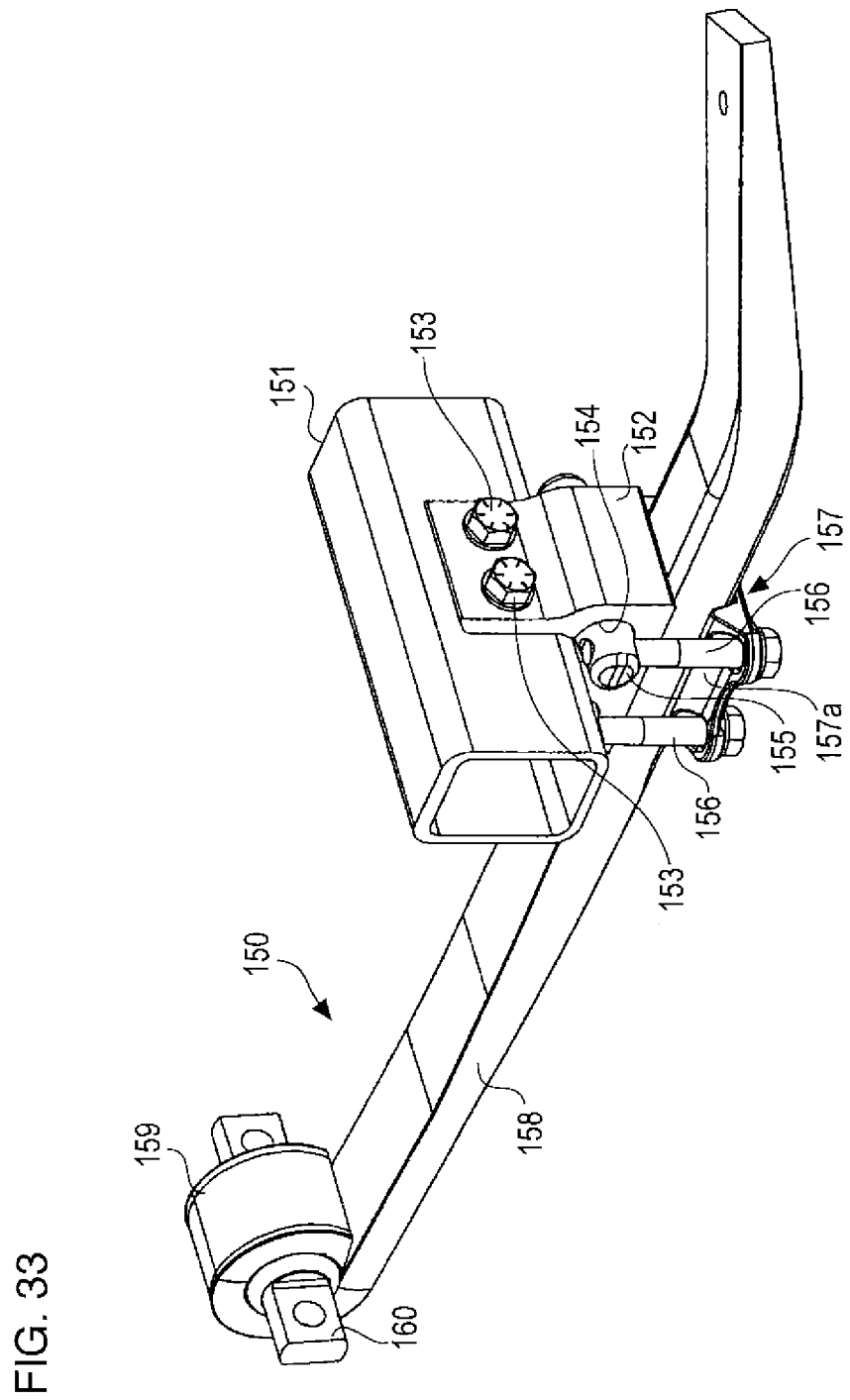

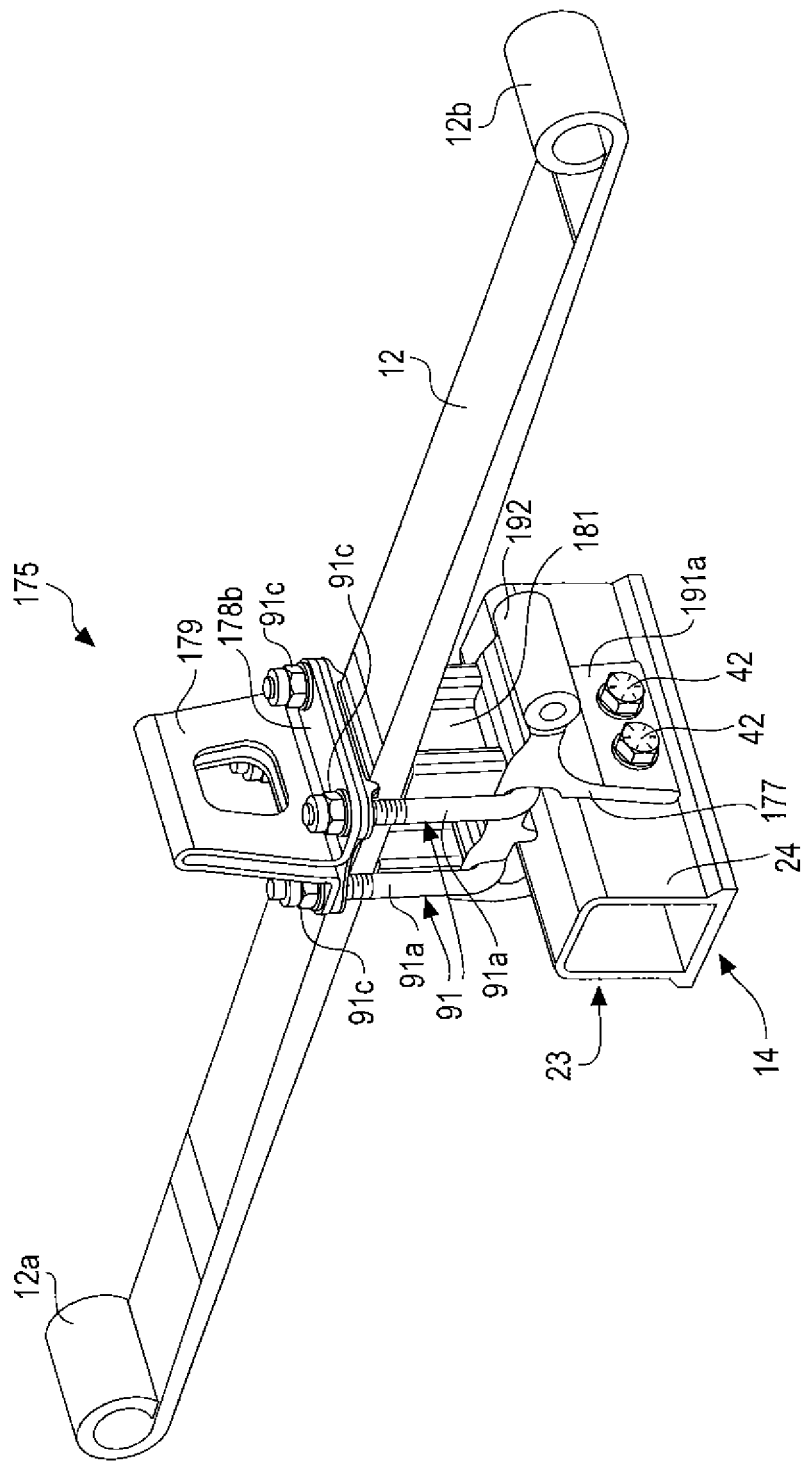

REDUCED WEIGHT AXLE MOUNTING ASSEMBLY FOR VEHICLE SUSPENSION SYSTEMS

CROSS-REFERENCE TO RELATED APPLICATION

This application claims the benefit of U.S. Provisional Patent Application Ser. No. 61/680,125, filed Aug. 6, 2012, the disclosure of which is hereby incorporated by reference in its entirety.

BACKGROUND OF THE INVENTION

1. Field of the Invention

The present invention generally relates to suspension systems for vehicles and, more particularly, to reduced weight axle mounting systems for wheeled vehicles and trailers. In this regard, an important aspect of this disclosure is directed to compact, reduced weight axle mounting assemblies for truck leaf spring suspensions.

2. Discussion of the Prior Art

Suspension systems for wheeled vehicles and trailers typically include active components which are designed to isolate disturbances encountered by the unsprung portions from the sprung portions. It will be appreciated that reduction in the weight of the unsprung portion (typically the wheels, axle and axle mounting assembly) is a desired design objective for improving the performance and efficiency of a suspension system, as well as increasing the payload capacity of the vehicle associated with the suspension.

Leaf springs in vehicle suspensions are commonly secured in an axle mounting assembly by spaced-apart bolts and U-bolts which, when clamped down on the spring, cause the portion of the spring between the clamping points to be inactive. Typically, bolts and U-bolts are longitudinally spaced apart by at least the width of the axle. Reducing the size of the clamped area is a desired design objective since it increases the length of the active portion of the spring, produces a lower vertical spring rate and permits a more compact, lighter weight axle mounting assembly.

Current axle mounting assemblies which utilize bolts and/or U-bolts often have to deal with the problem of keeping the bolt and nut faces parallel to a clamping surface. Accordingly, another design objective in these clamp assemblies is to lessen and/or eliminate this nut face angularity problem.

These design objectives and other shortcomings of prior art axle mounting assemblies are successfully addressed by the novel axle mounting assemblies disclosed herein.

SUMMARY OF THE INVENTION

This disclosure is directed to an axle mounting assembly for coupling an axle in wheeled vehicles and trailers to a suspension system that includes energy storing components such as, for example, leaf springs, or trailing arms or beams. It may be utilized in front and rear suspensions of motorized vehicles and trailers, and provides the suspension component, such as a leaf spring, with enhanced performance characteristics by reducing the size of the axle seat or clamp-down area, the size and weight of the assembly, thereby increasing the length of the active portion of the spring resulting in a reduced overall spring rate.

In a first aspect, disclosed herein is an axle mounting assembly for coupling a vehicle axle to an energy-storing suspension component such as a mono-leaf or multiple leaf spring. The assembly includes an axle seat bracket coupled to a vehicle axle adjacent at least one surface of the axle seat bracket and a mounting pad spaced from the axle seat bracket. A leaf spring suspension component having a longitudinal axis is disposed between the axle seat bracket and the mounting pad. The axle seat bracket includes at least two passages which are parallel to each other and extend perpendicularly to the longitudinal axis of the leaf spring. The passages are at least partially disposed between the leaf spring and the surface of the axle seat bracket which is in contact with the axle. At least two U-shaped fastener assemblies are coupled to the mounting pad, each of the U-shaped fasteners is received in one of the passages.

Each of the U-shaped fastener assemblies can be in the form of a bar pin with two opposed ends extending outwardly of the passage, each such end having a transverse bore in which a bolt is received. The center portion of the bar pins can be circular in cross section and the passage in which the bar pin is received can be generally cylindrically shaped, allowing the bar pin to rotate within the passage and the bolts extending from the ends of the bar pins to pivot and self-center themselves, causing the bolt and nut fasteners to obtain and maintain a parallel relationship to the clamping surface of a mounting pad.

In a further aspect of this disclosure, the previously described axle mounting assembly can also include a spacer located between the axle seat bracket and the leaf spring. The spacer has a leaf spring contacting surface and laterally extending sidewalls which terminate in a surface that is in contact with the axle seat bracket. The lateral sides preferably are spaced inwardly of the sides of the leaf spring, reducing the overall weight of the spacer and providing an open area in which the shafts of the bolts freely move to accommodate the aforementioned pivotal movement of the shafts of the bolts.

A further aspect of this disclosure concerns provision of an angled surface on the spacer in contact with the leaf spring and/or an angled surface on the axle seat bracket in contact with the spacer to impart a desired caster or pinion angle when the axle mounting assembly is installed in a suspension of a motorized vehicle.

A further aspect of this disclosure concerns a method for automatically adjusting for a caster or pinion angle in an axle mounting assembly for coupling a vehicle axle to a suspension component having a longitudinal axis in the form of an elongated energy storing component such as, for example, a mono-leaf or multi-leaf spring, which method includes providing an axle seat bracket configured to be coupled to the vehicle axle and wherein the axle seat bracket includes at least two parallel passages extending therethrough which are perpendicular to the longitudinal axis of the elongated energy storing component, providing at least two U-shaped fastener assemblies received in the passages of the axle seat bracket, providing a mounting pad spaced from the axle seat bracket, wherein each of the U-shaped fastener assemblies engages the mounting pad and is disposed within one of the passages and wherein the U-shaped fastener assemblies rotate to accommodate a caster or pinion angle within the axle mounting assembly.

In a further aspect of this disclosure an axle seat bracket has a single passage which is parallel to the axle and perpendicular to the energy-storing suspension component. The passage can be circular in cross-section or flat sided (e.g., square or rectangular) which receives a correspondingly configured bar pin or U-bolt for coupling the axle seat bracket to a mounting pad.

It is to be understood that both the foregoing general description and the following detailed description are exemplary and provided for purposes of explanation only and are not restrictive to the subject matter claimed. Further features and objects of the present disclosure will become more apparent in the following description of the example embodiments and from the appended claims.

DESCRIPTION OF THE DRAWINGS

In describing the preferred examples, reference is made to the accompanying drawing figures wherein like parts have like reference numerals and wherein:

FIG. 2 is an enlarged upper perspective view of a portion of the leaf spring and axle mounting assembly shown in FIG. 1;

FIG. 3 is a side elevational view of the partial leaf spring and axle mounting assembly shown in FIG. 2;

FIG. 10 is an enlarged side elevational view of the spacer component of the axle mounting assembly shown in FIGS. 1-5;

FIG. 11 is an enlarged upper front perspective view of the spacer component shown in FIG. 10;

FIG. 12 is an enlarged lower rear perspective view of the spacer component shown in FIG. 11;

FIG. 33 is a front upper perspective view of a suspension component in an underslung trailing arm suspension secured within a further embodiment of the present disclosure; and, FIG. 34 is an upper front perspective view of a suspension component of an underslung trailing arm suspension secured within a yet further embodiment of the axle mounting assembly of the present disclosure.

FIG. 35 is an upper perspective view of a leaf spring secured within an axle mounting assembly embodying features of a further embodiment of the present disclosure having a modified axle seat bracket which includes tapered flanges, a jounce stop and a shock absorber bracket;

DESCRIPTION OF THE ILLUSTRATED EMBODIMENTS

Figure 1:
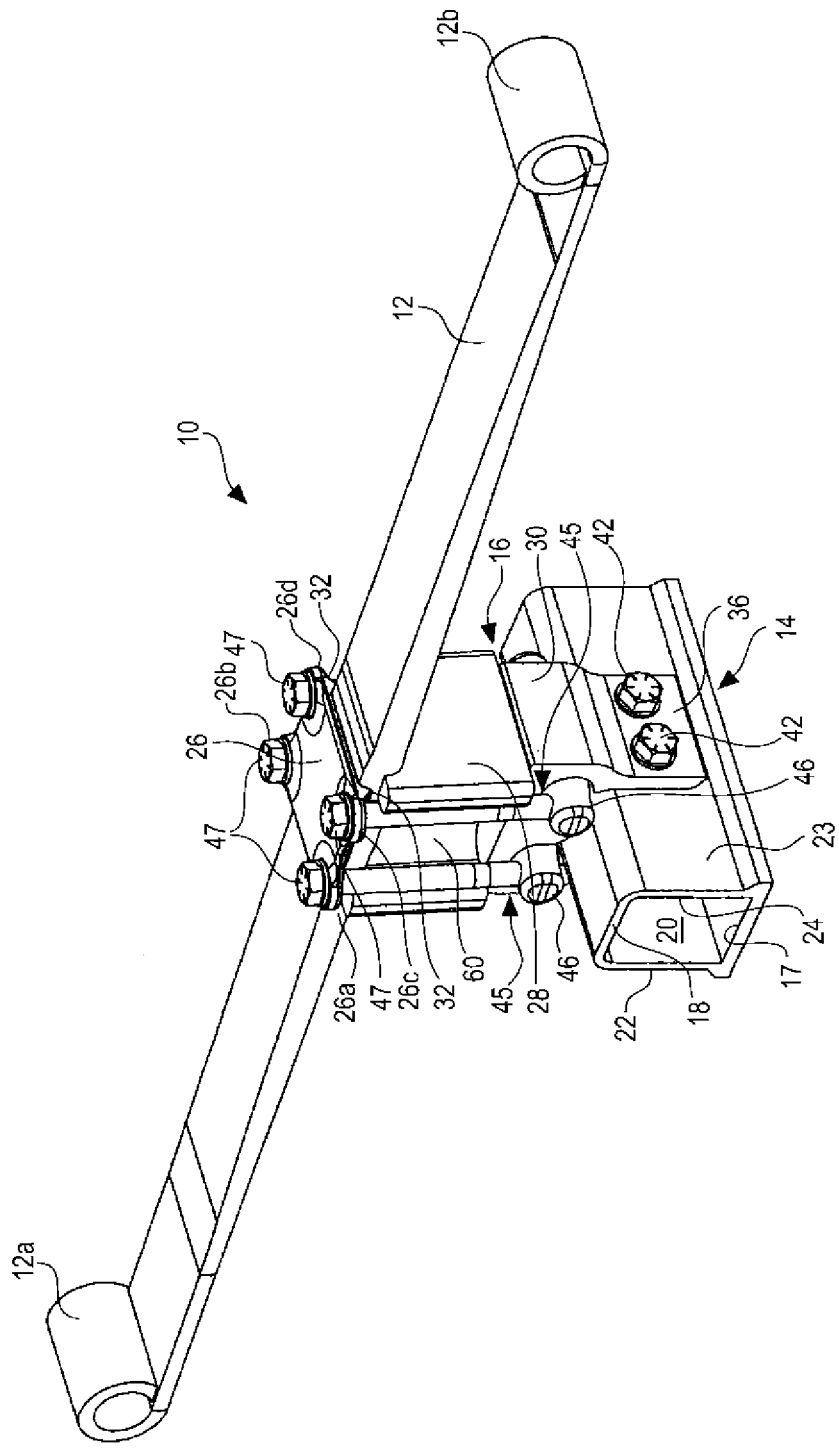
FIG. 1 is a front upper perspective view of a leaf spring secured within an axle mounting assembly embodying features of the present disclosure.
Figure 8:
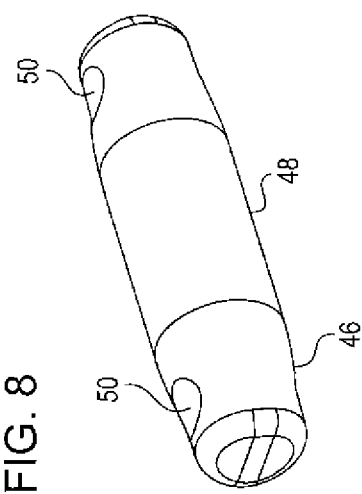
FIG. 8 is an upper front perspective view of the bar pin component of the axle mounting assembly shown in FIGS. 1-5.
Figure 9:
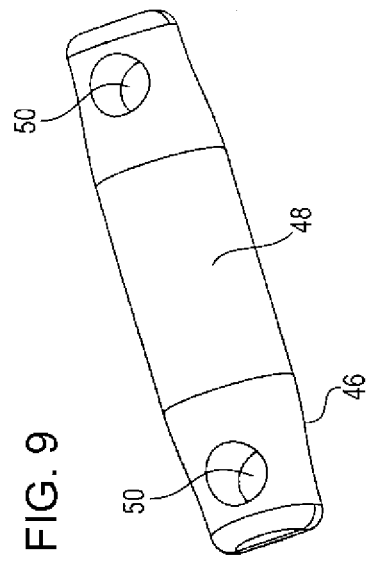
FIG. 9 is an upper top perspective view of the bar pin component shown in FIG. 8.

Referring to the drawings, a first embodiment of this disclosure is shown in FIGS. 1-15. In particular, in FIGS. 1-5, the reference numeral 10 generally designates a suspension system that includes a leaf spring 12 mounted to a fabricated axle 14 utilizing an axle mounting assembly 16 embodying features of the present invention. Leaf spring 12 includes a front eye 12a, a rear eye 12b, each of which is sized and configured to receive a bushing (not shown). As with this and the other drawings in this disclosure, it will be appreciated that the figures show a system for one side of a wheeled vehicle or trailer and that a similar system would be provided on the opposite side to form a full suspension system.

As shown, the fabricated axle 14 includes a laterally extending box section having a bottom plate 17 welded to an inverted U-shaped member 18. The axle 14 may be constructed of steel or other suitable materials, and may be constructed in the manner described or by alternate manufacturing techniques to result in a fabricated hollow axle, or it may be constructed as a solid axle.

Viewing the illustrated axle mounting assembly 16 from the top downward, it includes a mounting pad 26, a leaf spring 12, a generally I-shaped spacer 28, and an axle seat bracket 30. The mounting pad 26 is preferably forged or cast iron or steel, while the spacer 28 and the axle seat bracket 30 are preferably constructed of extruded aluminum, although other suitable grades of aluminum may be used, and other suitable materials, configurations and methods of construction may be used, including, for example, cast iron or steel parts. The mounting pad 26 of this example also includes locating extensions 32 which extend downward to engage the sides of the leaf spring 12.

The axle seat bracket 30 is fitted over the top of axle 14 and includes an upper surface 34 on which the spacer 28 rests, a bottom surface 35 that engages the axle 14, and downwardly extending flanges 36. It will be appreciated that liners optionally may be disposed between the top of leaf spring 12 and the bottom of mounting pad 26, as well as between the axle seat bracket 30 and the axle 14. The respective downwardly extending flanges 36 which include bores 38 that receive cylindrical sleeves 40, constructed of aluminum, steel or the like, through which extend fasteners 42, such as hardened bolts, that engage nuts 42a for connecting the axle seat bracket 30 to the axle 14. For enhanced support to the axle when the fasteners 42 are tightened, the sleeves 40 that are located within the bores are also received within the channels 43a of an axle baffle 43 within the axle 14. The sleeves 40 are sized to fit within the bores 37 in the axle 14, while being slightly shorter than the distance between the interior surfaces 20, 24 of the inverted U-shaped member 18 of the axle 14. This permits a connection with slight deformation in the U-shaped member 18 of the axle 14 to provide solid clamping of the axle seat bracket 30 to the axle 14. It will be appreciated that the sleeves 40 and/or the support 43 may not be necessary, depending on the construction of the axle 14 and the axle seat bracket 30.

In the illustrated embodiment, the axle seat bracket includes passages 44 that are generally cylindrically shaped and parallel to the axle 14. Passages 44 receive respective U-shaped fastener assemblies 45 which include bar pins 46, each of which in the illustrated embodiment has a cylindrical center portion 48 and is configured to rotate within the passage 44. Each bar pin 46 is preferably constructed of forged heat-treated steel for desired strength, but may be constructed of other suitable materials and by other suitable methods. Each bar pin 46 has a transverse bore 50 at each end, each bore 50 receiving a bolt 47. In this example, the U-shaped fastener assemblies 45 further include hardened bolts that extend through the respective bores 26a-d in the mounting pad 26 (FIG. 13) having threaded ends that engage at least some of the respective threads within the bores 50 of the bar pin 46. When tightened, fasteners 47 clamp together the top pad 26, the leaf spring 12, the spacer 28 and the axle seat bracket 30, ultimately coupling the axle 14 to the leaf spring 12. The threaded ends of fasteners 47 mate with the threads in the bores 50 of bar pins 46. Alternate ways of fastening the components to each other may be used, such as if the bores 50 do not include the threads but are sized to allow sufficiently longer fasteners, such as threaded bolts, to pass therethrough and to receive nuts on the distal ends by which the clamp load may be applied.

It will be appreciated that vehicles often have a front axle with a fixed caster angle, or a rear drive axle with a fixed pinion angle. Accordingly, as shown in the first example, a caster angle may be included within the axle mounting assembly 16 by, for example, including it within the configuration of spacer 28. Thus, in the illustrated embodiment the spacer 28 includes an upper surface 54 that engages the lower surface 12c of the leaf spring 12 and is angled relative to the lower surface 56 of the spacer 28. A fixed caster angle could otherwise be provided by including an additional wedge component (not shown) or could be built into the axle seat bracket 30. However, a common axle seat bracket 30 may be used if the caster or pinion angle is provided by a spacer or a wedge component.

The U-shaped fastener assemblies 45 including the bar pins 46 will allow the axle assembly 16 to automatically adjust to an assembly that includes a caster or pinion angle, as the bar pins will rotate to an accommodative angle within the axle seat bracket 30 as the bolts 47 are tightened. This results in the faces of respective bolts 47 being parallel to the clamping surfaces provided on the mounting pad 26. This effectively eliminates or at least minimizes problems with nut face or bolt head angularity that could occur during clamp up of the axle mounting assembly 16. Notably, bolts 47 having a similar length may be used in an assembly having a component that includes a caster or pinion angle, which may result in the bolts on the thinner end of the axle mounting assembly 16 traveling further through the respective bar pins 46.

The spacer 28 of this illustrative example also includes locating extensions 58 that extend upward beyond the upper surface 54 and assist in positioning the leaf spring 12 relative to the axle 14. To reduce the weight of the spacer 28, the sides 60 of the spacer 28 preferably are sculpted. It will be appreciated that spacer 28 may be extruded as noted above, and then machined to introduce a caster angle and the locating extensions 58.

Figure 4:
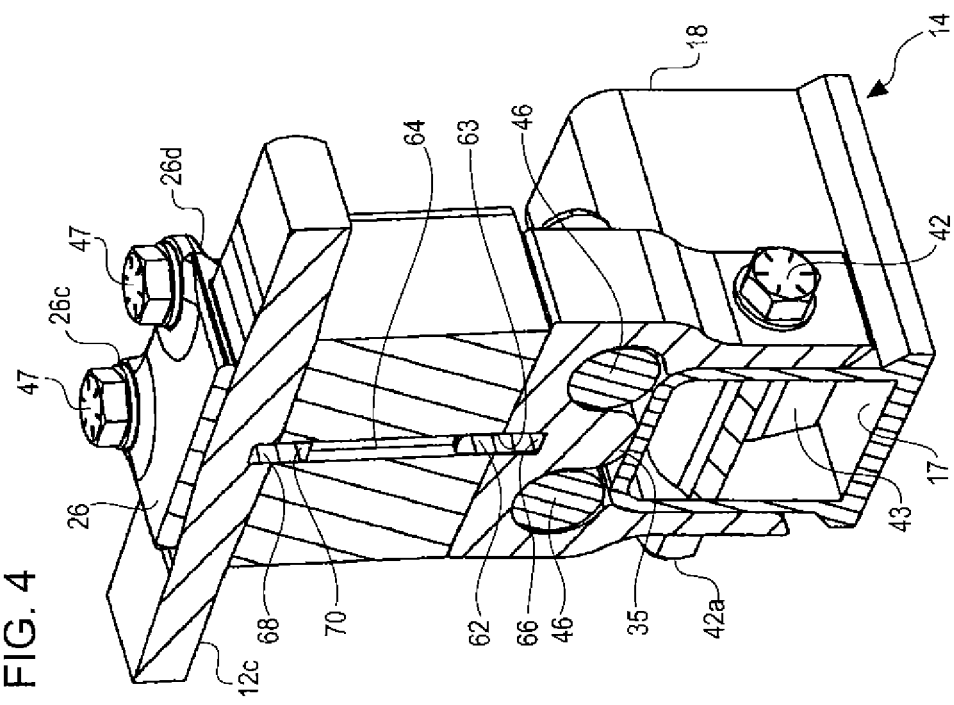
FIG. 4 is a cross-sectional perspective view through the center of the axle and axle mounting assembly shown in FIGS. 2 and 3.

As best shown in FIG. 4, a locating feature is provided by engagement of a pin or stud 62 with a locator 63 at the lower end of a central passage 64 in the spacer 28. An associated locator 66 is configured as a receptacle in the upper surface 34 of the axle seat bracket 30. Correspondingly, leaf spring 12 also includes a locator 68 in the form of a receptacle in the lower surface 12c in which a pin or stud 70 is received. When assembled, the stud 70 is also received in a location 72 within the upper end of central passage 64 within the spacer 28. The locator 68 that receives the stud 70 in the upper end of central passage 64 assists in positioning and holding the leaf spring 12 longitudinally within the axle mounting assembly 16.

Figure 5:
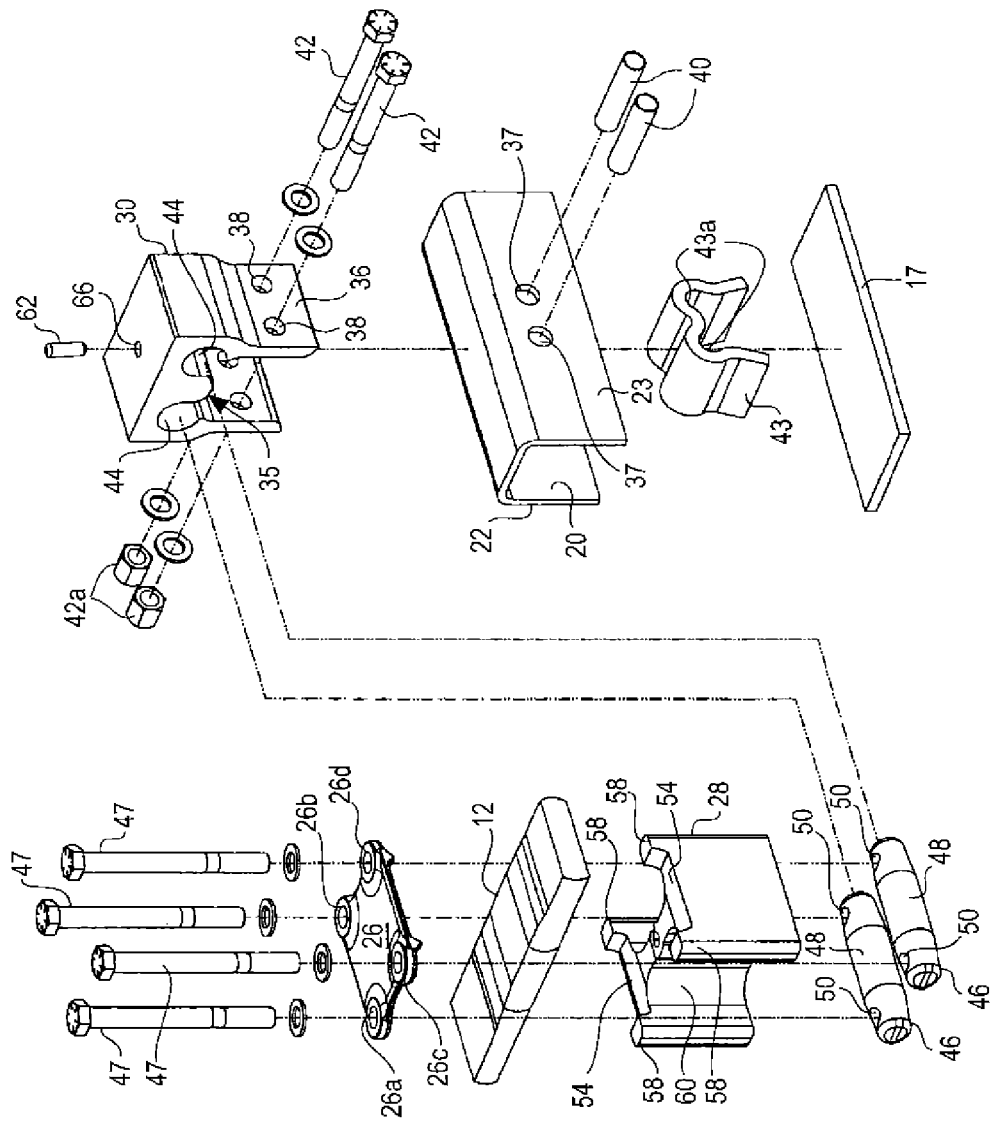
FIG. 5 is an exploded perspective view of the partial leaf spring and axle mounting assembly shown in FIGS. 1-4.
Figure 13:
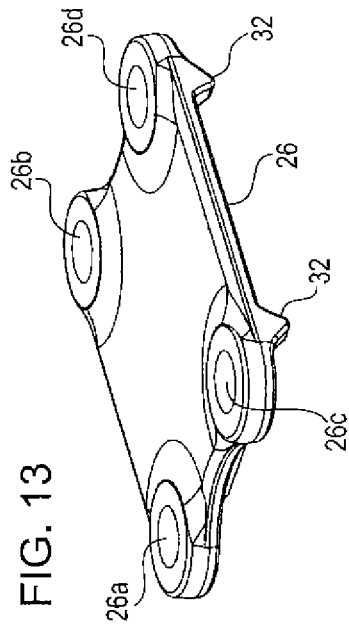
FIG. 13 is an enlarged upper side perspective view of the top pad component of the axle mounting assembly shown in FIGS. 1-4.
Figure 14:
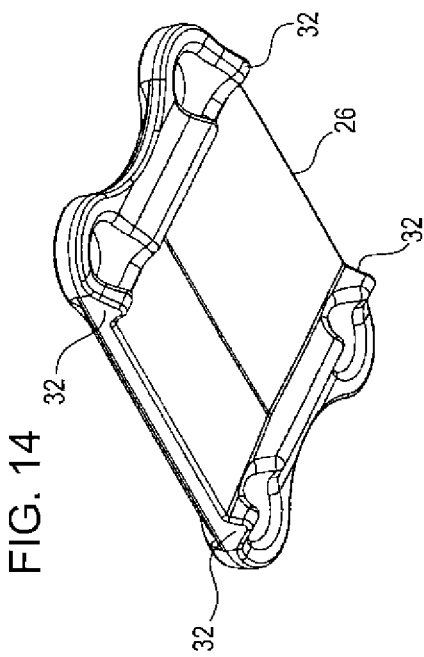
FIG. 14 is an enlarged lower bottom perspective view of the top pad component shown in FIG. 13.
Figure 6:
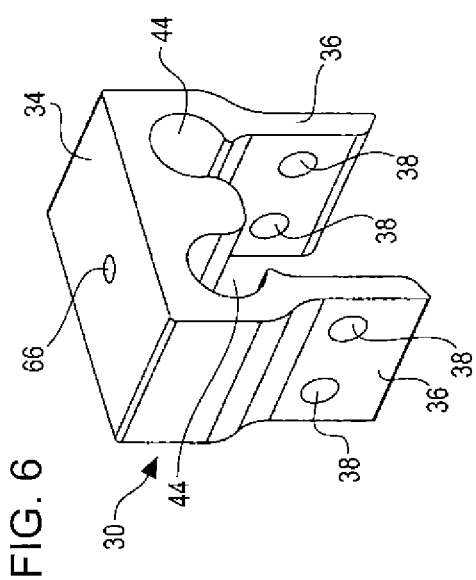
FIG. 6 is an upper rear perspective view of the axle seat bracket of the axle mounting assembly shown in FIGS. 1-4.
Figure 7:
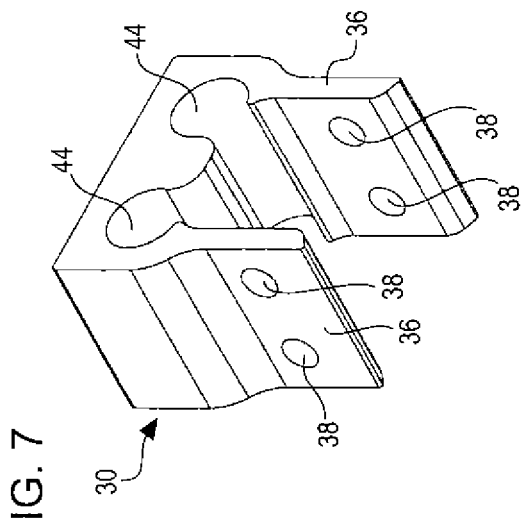
FIG. 7 is a lower rear perspective view of the axle seat bracket shown in FIG. 6.

As best shown in FIGS. 2 and 3, bar pins 46 are preferably spaced apart by a distance which is less than the width of axle 14 (i.e., less than the distance between the outside surfaces of front facing wall 22 and rear facing wall 23). This produces a clamp-down (inactive) area for the leaf spring 12 which, as shown in FIGS. 5 and 13, is generally longitudinally defined by bores 26a and 26b in the fore position and bores 26c and 26d in the aft position, as well as laterally by bores 26a and 26c on the left and by bores 26b and 26d on the right.

It will be appreciated that by positioning bar pins 46 closer to each other, the longitudinal distances between the bolts 47 may be shortened and the clamp-down (inactive) area of the leaf spring may be significantly reduced (i.e., on the order of 50%), resulting in an increase of the effective active length of the active portion of the spring, producing a lower vertical spring rate and a lighter weight axle mounting assembly.

The mechanical interconnections between each of the elements of the axle mounting assembly 16 that are provided by the locators and pins (i.e., at the interface between the bottom 12c of spring 12 and the upper surface 54 of spacer 28 and between the lower surface 56 of spacer 28 and the top surface 34 of axle seat bracket 30) help to control a portion of the longitudinal forces experienced by the axle mounting assembly thereby decreasing the amount of clamping force that must be transmitted through the U-shaped fastener assemblies 45. This may allow the use of smaller bolts 47, further reducing the weight and cost of the suspension.

Figure 15:
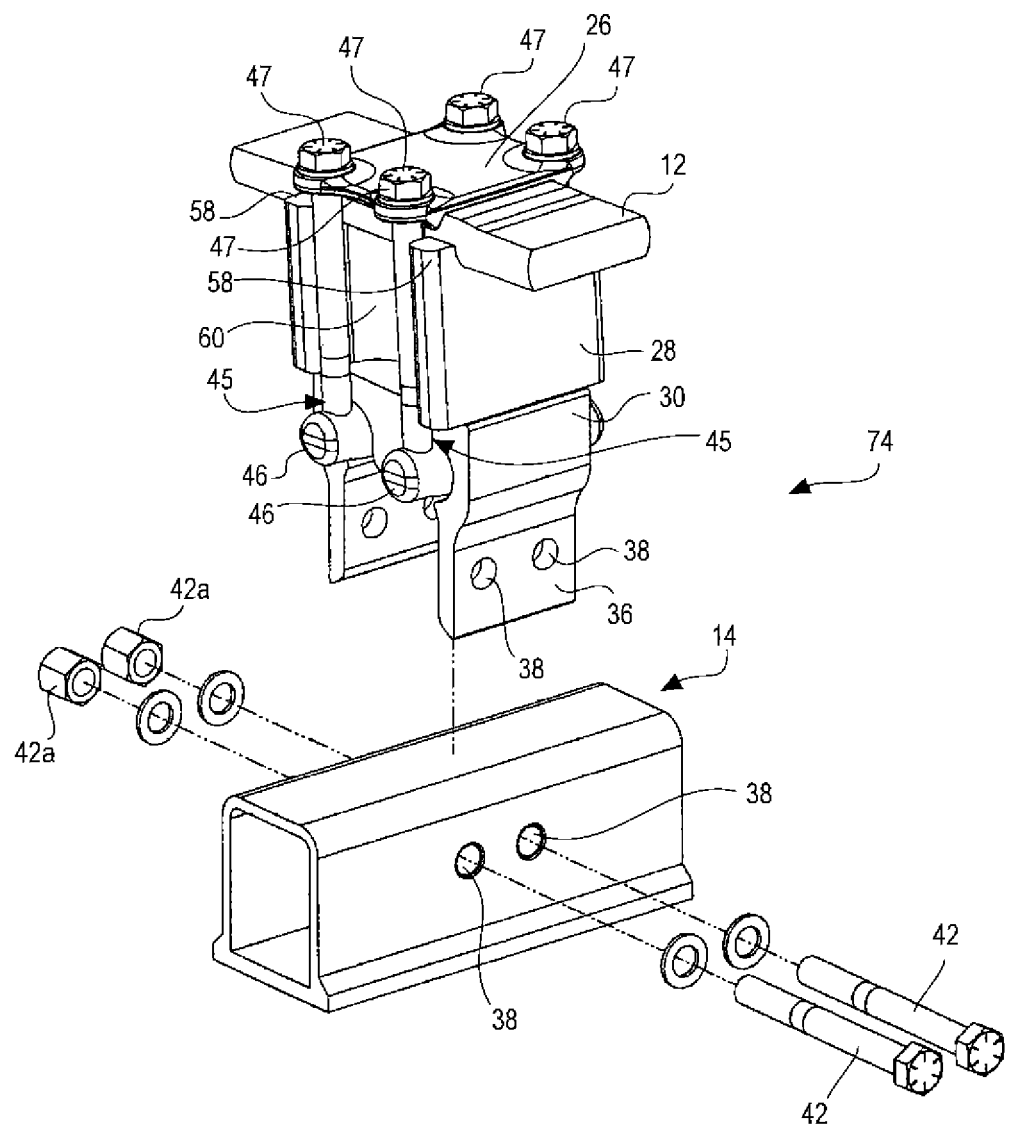
FIG. 15 is an exploded perspective view showing a partial leaf spring in a preassembled axle mounting assembly of the present invention wherein the axle seat bracket utilizes a pair of bar pin fasteners, schematically showing a method of installing the disclosed axle mounting assembly to the axle from below.

FIG. 15 schematically illustrates a method of manufacture and installation of the axle mounting assembly 16 which is particularly suitable for vehicle assembly lines that do not permit full access to the heads of the bolts 47 from above. As designated by reference number 74 in FIG. 15, the axle mounting assembly components which include the mounting pad 26, leaf spring 12, spacer 28 and axle seat bracket 30 can be pre-assembled and transferred as a unit to the vehicle manufacturer's assembly line. They can then be installed as a unit to the vehicle, and the axle 14 may be lifted into place and secured to the assembly 74 via the bolt fasteners 42 and nuts 42a.

Figure 16:
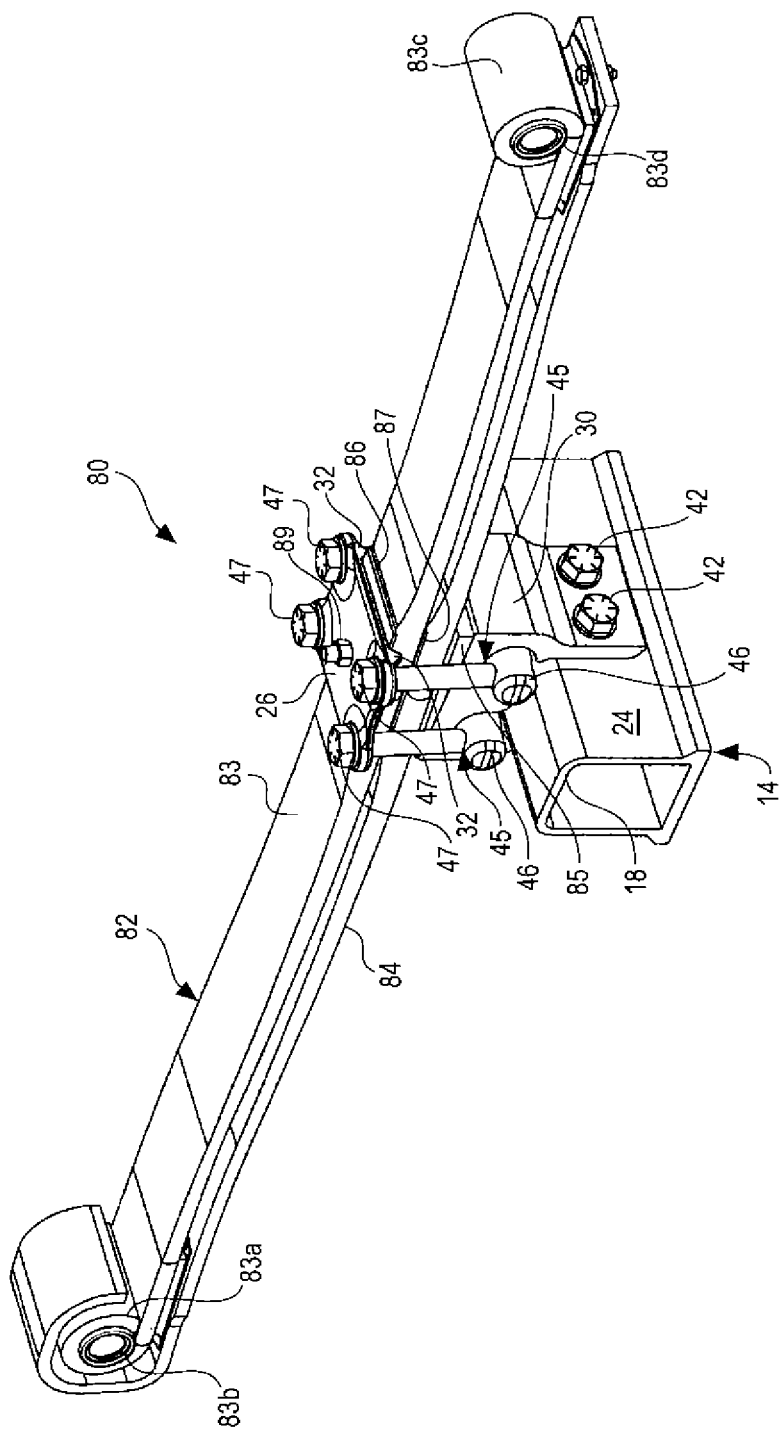
FIG. 16 is a front upper perspective view of a dual leaf spring secured within an axle mounting assembly embodying features of another embodiment of the present disclosure.
Figure 17:
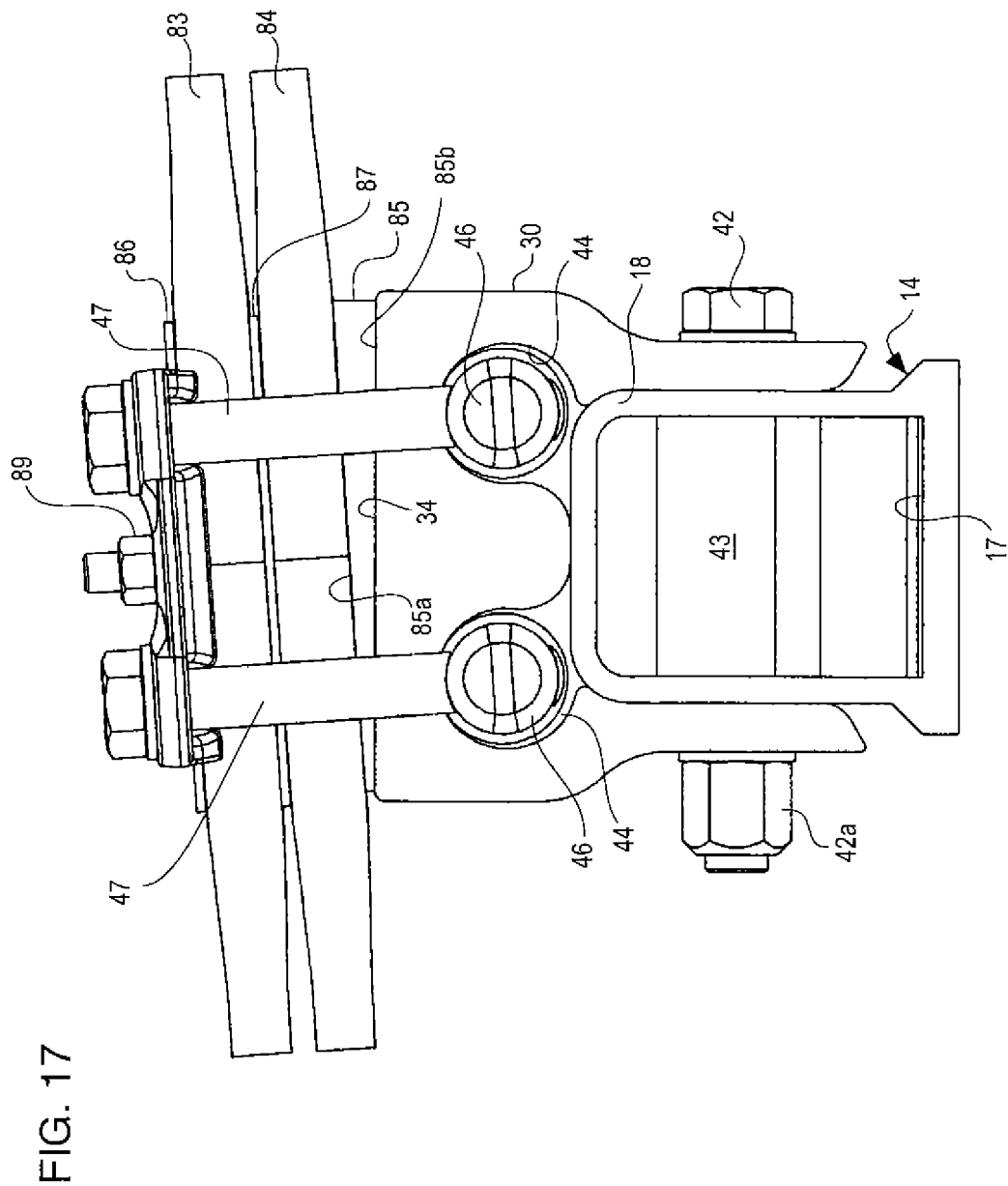
FIG. 17 is an enlarged side elevational view of a portion of the dual leaf spring and axle mounting assembly shown in FIG. 16.
Figure 18:
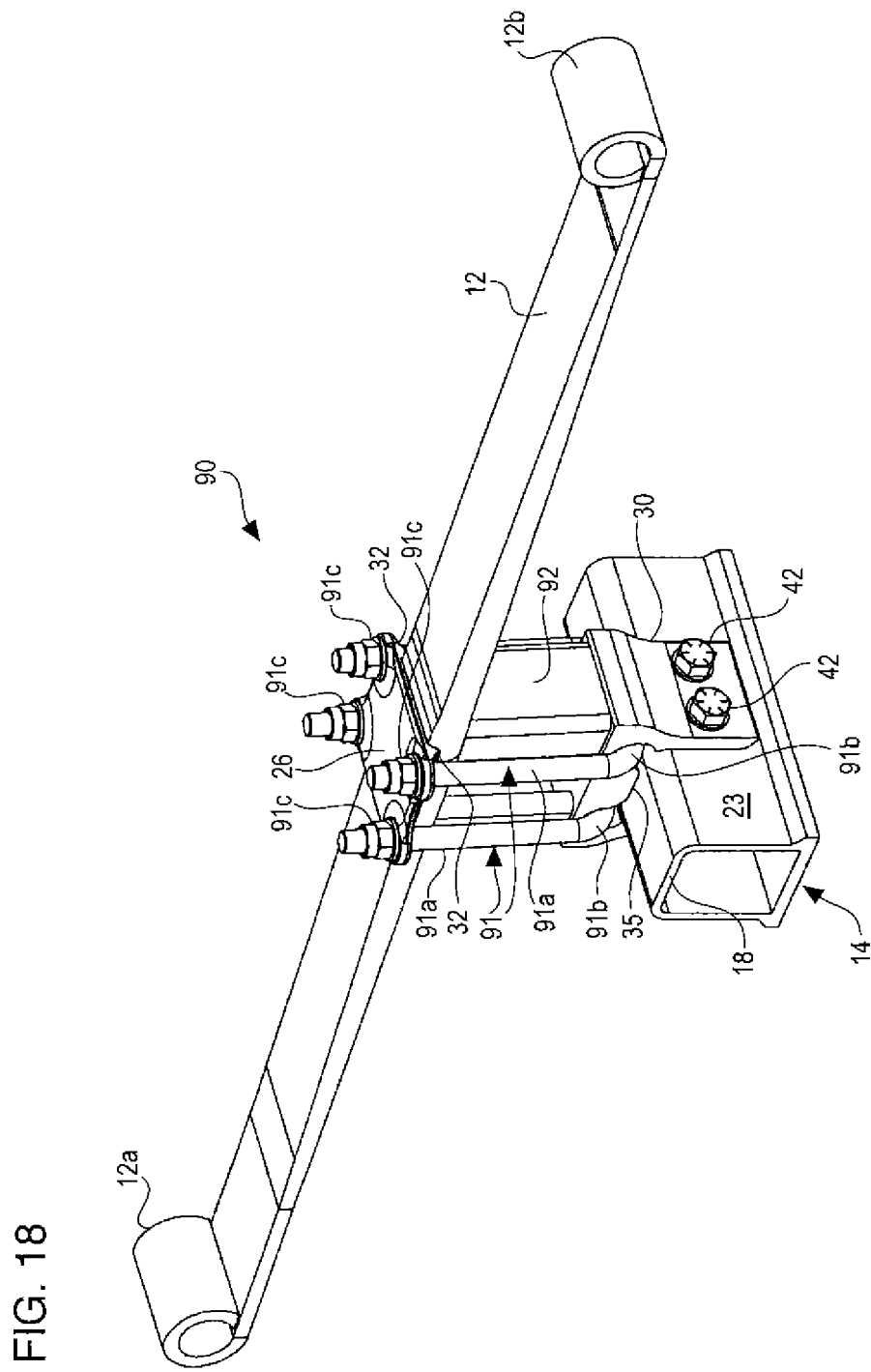
FIG. 18 is a rear upper perspective view of a leaf spring secured within an axle mounting assembly embodying features of a further embodiment of the present disclosure.
Figure 19:
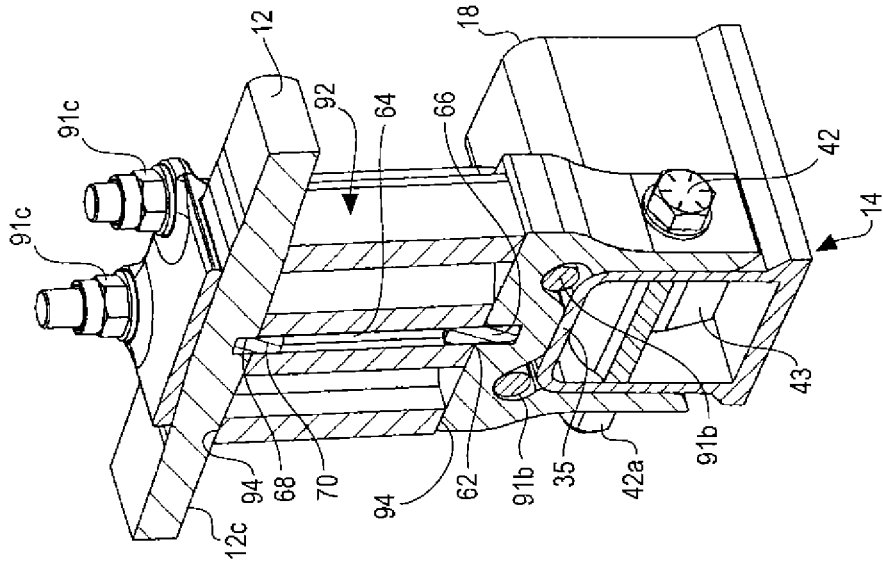
FIG. 19 is a side cross-sectional view of the center of the axle and axle mounting assembly shown in FIG. 18.
Figure 20:
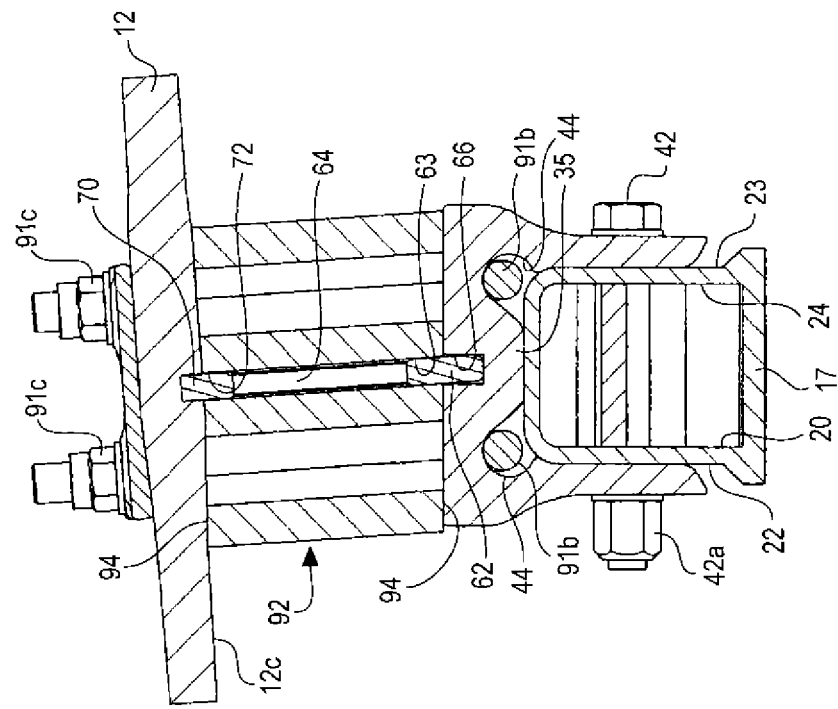
FIG. 20 is a cross-sectional perspective view through the center of the axle and axle mounting assembly shown in FIGS. 18 and 19.

The second embodiment of the present invention is shown in FIGS. 16-17, and includes many of the same components previously described in the first embodiment. Accordingly, the same reference numerals and the descriptions above with respect to the first example apply as to those same components. This embodiment is generally designated by the reference numeral 80 and has dual parallel leaf springs 82 which includes an upper leaf spring 83 and lower leaf spring 84. As shown, upper leaf 83 includes a front eye 83a, a front eye bearing 83b, and a rear eye 83c and a rear eye bearing 83d. A wedge component 85 having an inclined upper surface 85a is positioned below lower leaf 84 and imparts a desired caster angle or pinion angle to the dual leaf springs 82.

As in the case of the first embodiment, the U-shaped fastener assemblies 45 having bar pins 46 rotate within in passages 44 to keep the faces the bolts 47 parallel to the clamping surface of the mounting pad 26 when being tightened, thereby minimizing and/or eliminating any problems of nut face singularity, while providing a lighter weight axle mounting assembly.

If desired, deformable liners 86 and 87 may be used between the bottom of the mounting pad 26 and the top surface of the upper leaf spring 83 between the bottom surface of upper leaf 83 and the top surface of and lower leaf spring 84, respectively.

Referring to FIG. 17 it will be noted in this embodiment the bottom surface 85b and top surface 34 of axle seat bracket 30 are generally horizontal. It will be appreciated, however, that the caster or pinion angle in the axle mounting assembly could be provided by eliminating the wedge 85 and machining or otherwise shaping the top surface 34 to introduce the desired caster or pinion angle to the axle mounting assembly. A third embodiment of the present invention is shown in FIGS. 18-21 and includes many of the same components previously described in the first embodiments. Accordingly, the same reference numerals and descriptions above with respect to the first example apply to those same components. This embodiment is designated by the reference numeral 90 and can be generally characterized as incorporating U-shaped fastener assemblies 91 in place of the bar pins 46 and fasteners 47 of the first embodiment. As was the case for the first embodiment, the U-shaped fastener assemblies 91 are preferably spaced apart by a distance which is less than the width of the axle (i.e., less than the distance between the outside surfaces of the front facing axle wall 23 and rear facing axle wall 24.

As was the case with the first embodiment, the U-shaped fastener assemblies 91 are captured within parallel passages 44 of the axle seat bracket 30 and are at least partially in vertical alignment with the overall width of the top surface of axle 14. The axle seat bracket 30 has a bottom surface 35 that engages the axle 14.

Figure 21:
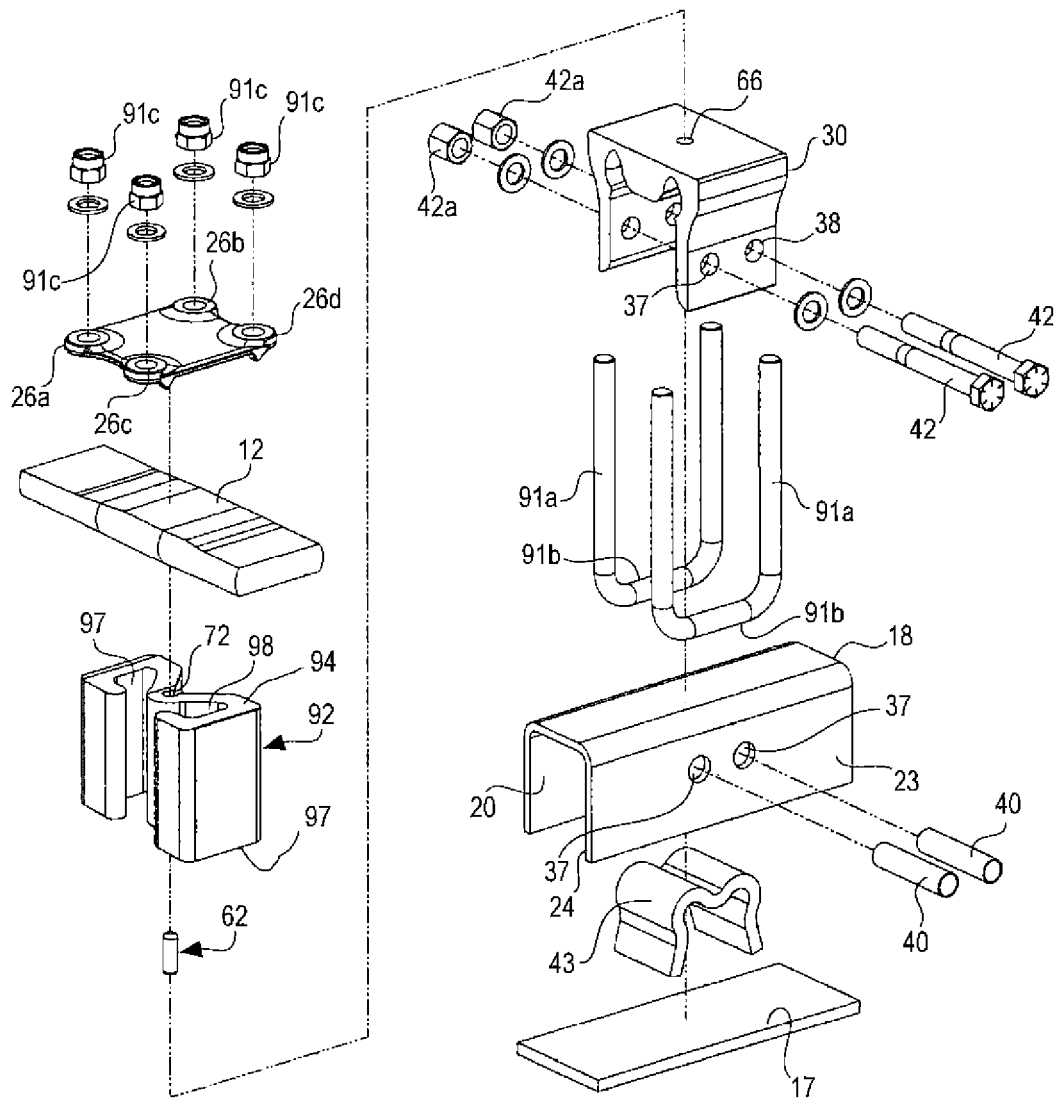
FIG. 21 is an exploded perspective view of the partial leaf and axle mounting assembly shown in FIG. 18.

As best shown in FIG. 21, each of the U-shaped fastener assemblies 91 includes a U-bolt having upwardly extending legs 91a which extends upwardly from a bight portion 91b consisting of opposed arcuate segments and a straight segment. It will be appreciated that the precise configuration of this bight portion can vary in accordance with particular design considerations and that equivalent segments interconnecting the upwardly extending straight portions could be substituted in place thereof. The upwardly extending end portions of the straight sections 91a are threadedly received in nuts 91c.

The spacer 92 of this embodiment is generally similar to the I-shaped spacer 28 of the first embodiment, however, as is best shown in FIG. 21, it includes an upper surface 94 and a lower surface 96, as well as cut-out portions 97, 98 which serve to reduce the weight of the spacer.

In this illustrated embodiment, the top surface 94 of spacer 92 includes a caster or pinion angle which engages the lower surface 12a of the leaf spring 12 which can be provided by machining the extruded spacer body. It will be appreciated that a fixed caster or pinion angle could be provided by including an additional wedge component (not shown) or could be built into the axle seat bracket 30. In either event, as the nuts 91c are installed and tightened, the U-shaped fastener assemblies 91 rotate to accommodate nut face angularity while reducing axle mounting assembly weight.

Figure 22:
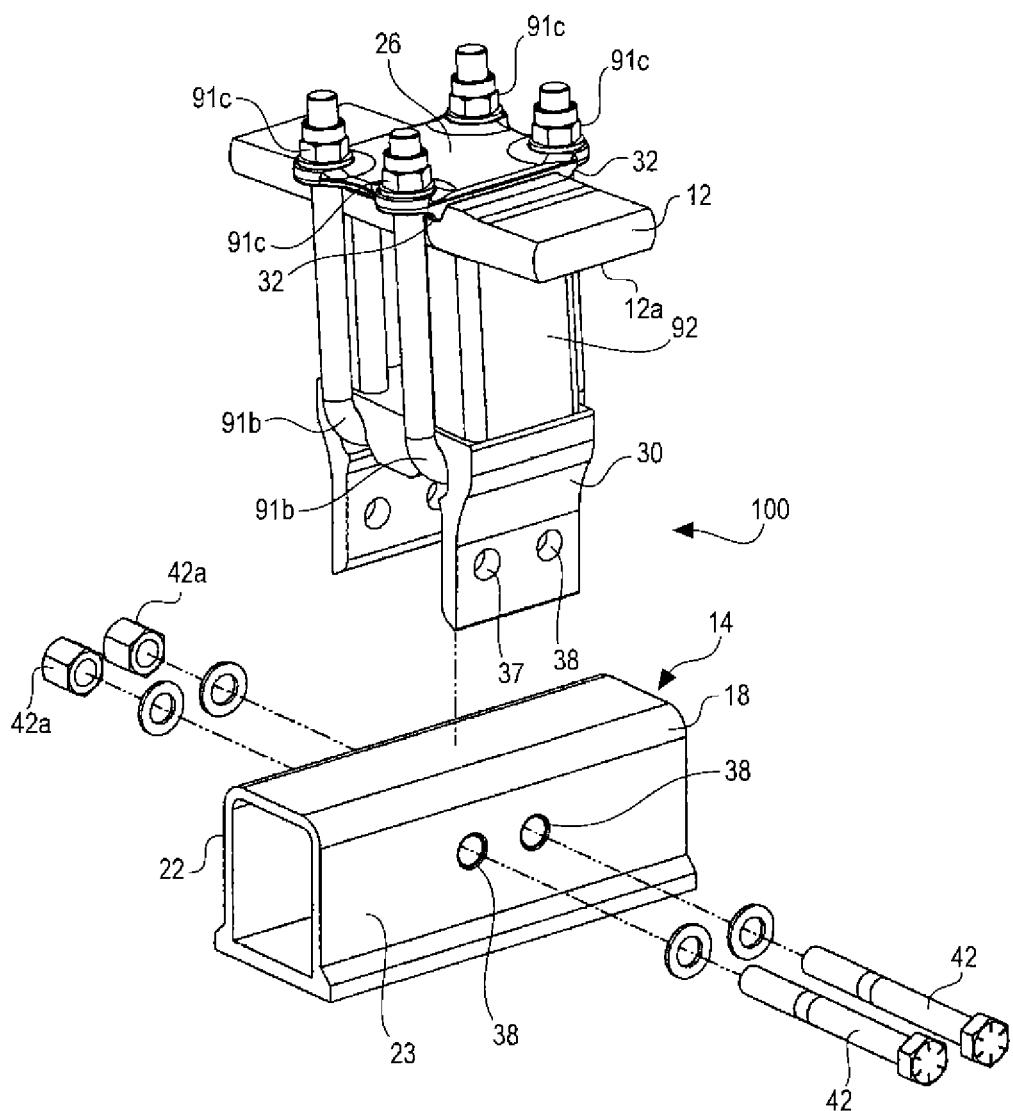
FIG. 22 is an exploded perspective view showing a partial leaf spring in an axle mounting assembly shown in FIG. 18 embodying the present invention wherein the axle seat bracket utilizes a pair of captured U-bolts, schematically illustrating a method of installation of a disclosed axle mounting assembly to the axle from below.

FIG. 22 schematically illustrates a method of manufacture and installation of the axle mounting assembly 90 which is particularly suitable for vehicle assembly lines that provide limited access to the nuts 91c from above. As designated by reference numeral 100 in FIG. 22, the axle mounting components, which include the mounting pad 26, leaf spring 12, spacer 92 and axle seat bracket 30, can be pre-assembled and transferred as a unit to the vehicle manufacturer's assembly line. The axle 14 can then be installed via bolt fasteners 42 and nuts 42a.

Figure 23:
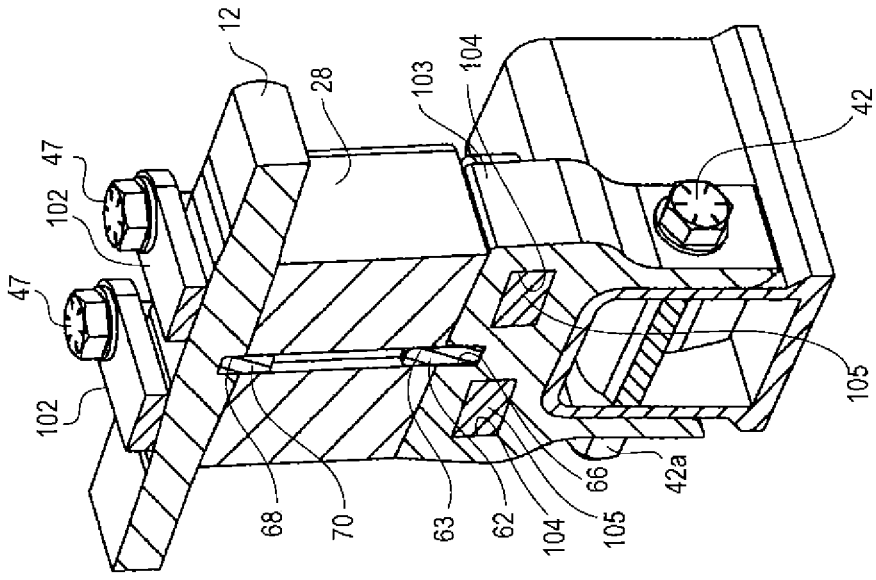
FIG. 23 is an upper perspective view of a partial leaf spring and another embodiment of the axle mounting assembly of the present disclosure wherein the axle seat bracket utilizes a pair of rectangularly-shaped bar pins.
Figure 24:
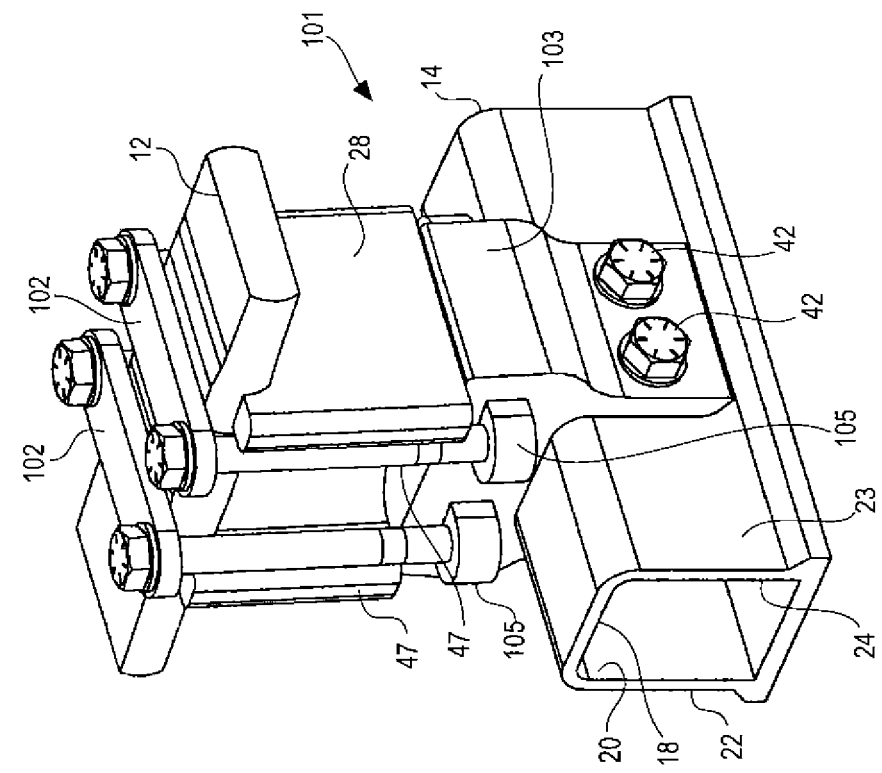
FIG. 24 is a cross-sectional perspective view through the center of the axle mounting assembly shown in FIG. 23.

Another embodiment of the present disclosure is shown in FIGS. 23 and 24 and includes many of the same components which were previously described in connection with the first embodiment. Accordingly, the same reference numerals and descriptions with respect to those components apply to this embodiment as well. As shown, this axle mounting assembly is designated by the reference numeral 101 and includes, from the top downward, a pair of elongated mounting pads 102, a leaf spring 12, a spacer 28 and a modified axle seat bracket 103. While the spacer 28 and modified axle seat bracket 103 are preferably constructed of extruded aluminum, the mounting pads 102 are preferably of forged or cast iron or steel.

The axle seat bracket 103 has a bottom surface that engages the axle 14 and includes a pair of flat-sided rectangular passages 104 extending therethrough, each of which receives a correspondingly shaped bar pin 105. Preferably, the passages 104 and bar pins 105 are spaced apart by a distance which is less than the width of the axle 14, so that the longitudinal distances between the bar pins 105 is shortened and the axle seat or clamp-down (inactive) area of the leaf spring 12 is significantly reduced.

Caster and pinion angles can be incorporated into the assembly in the same fashion as was described with regard to the axle mounting assembly 16 of the first embodiment, with the passages 104 having a preselected angle that corresponds to the caster or pinion angle.

Figure 26:
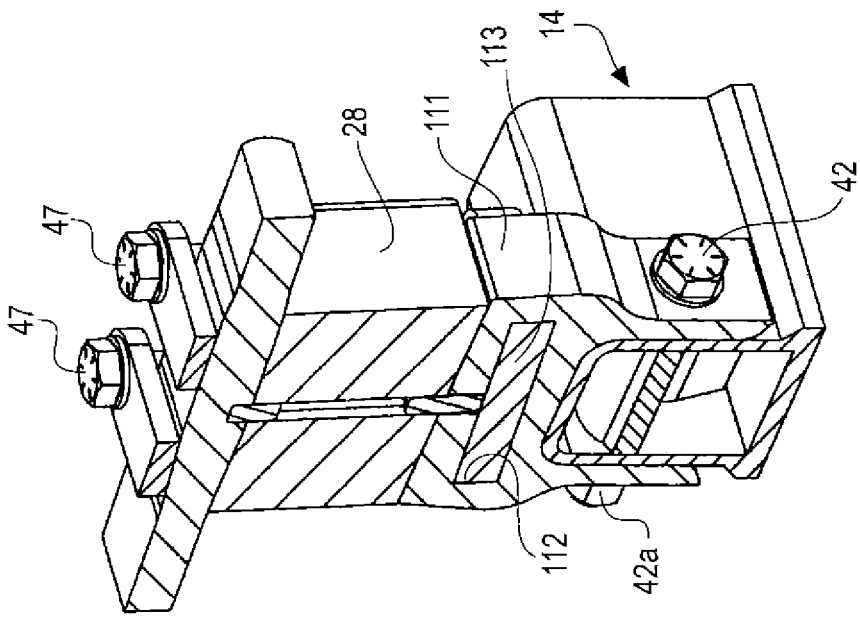
FIG. 26 is a cross-sectional perspective view through the center of the axle seat bracket shown in FIG. 25.
Figure 25:
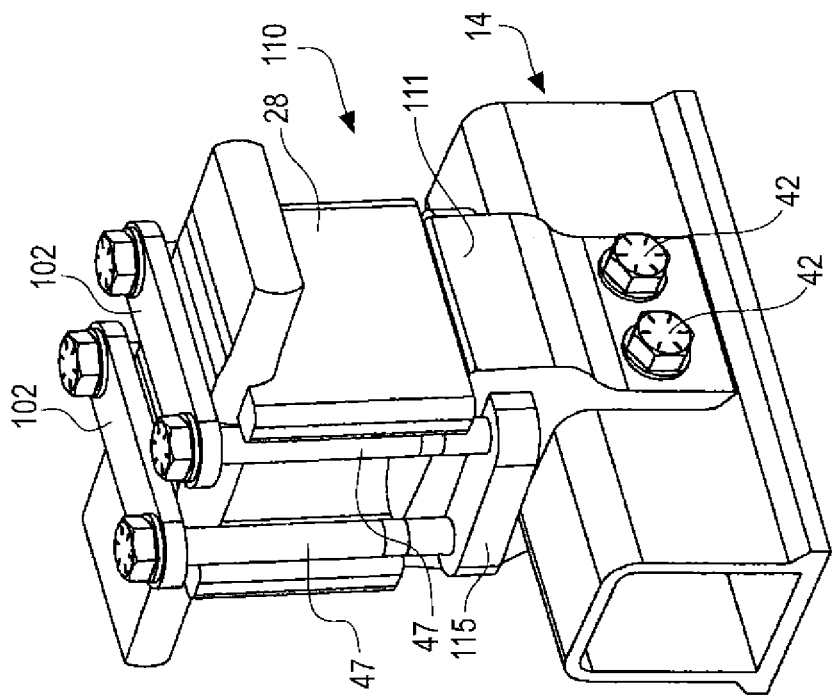
FIG. 25 is an upper perspective view showing a partial leaf spring and another embodiment of the axle mounting assembly of the present disclosure which utilizes a single enlarged rectangularly-shaped bar pin.

Another embodiment of the present disclosure, designated by the reference numeral 110, is shown in FIGS. 25 and 26. It includes many of the same components as previously described in connection with the axle mounting assembly 101 of FIGS. 23 and 24. In this embodiment, however, the two flat sided passages 104 of the previous embodiment are replaced by a wider single passage 112 that extends through the body of the axle seat bracket 111. A rectangular correspondingly sized and configured bar pin 113 is received in the passage 112 and includes outwardly extending end portions 115, each of which includes a pair of internally threaded bores sized and positioned to threadingly engage with the bolts 47. While, as shown, the axle mounting assembly 110 has a bottom surface that engages the axle 14 and includes a pair of mounting pads 102, it will be appreciated that a single four-bore mounting pad like mounting pad 26 described in connection with the first embodiment could be substituted in place thereof.

Figure 28:
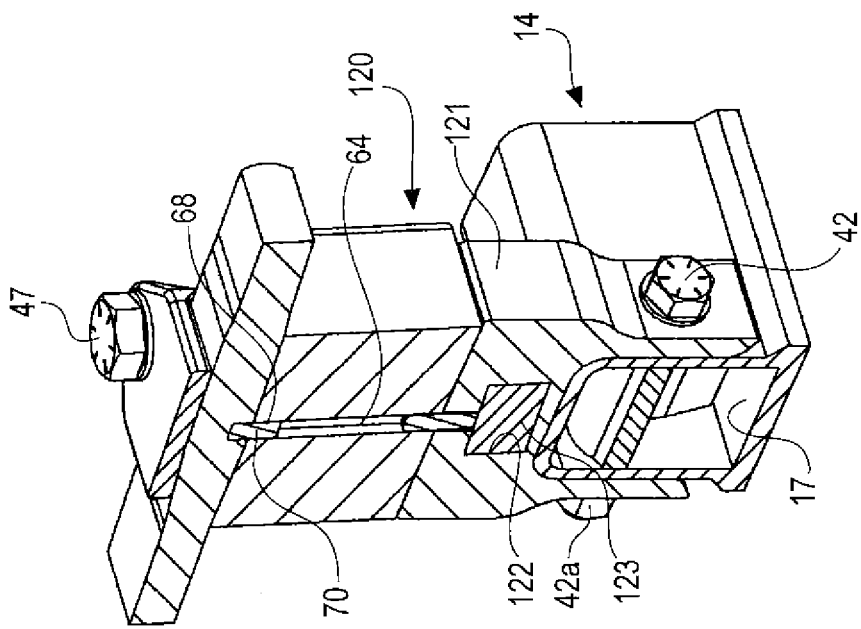
FIG. 28 is a cross-sectional perspective view through the center of the axle seat bracket shown in FIG. 25.
Figure 27:
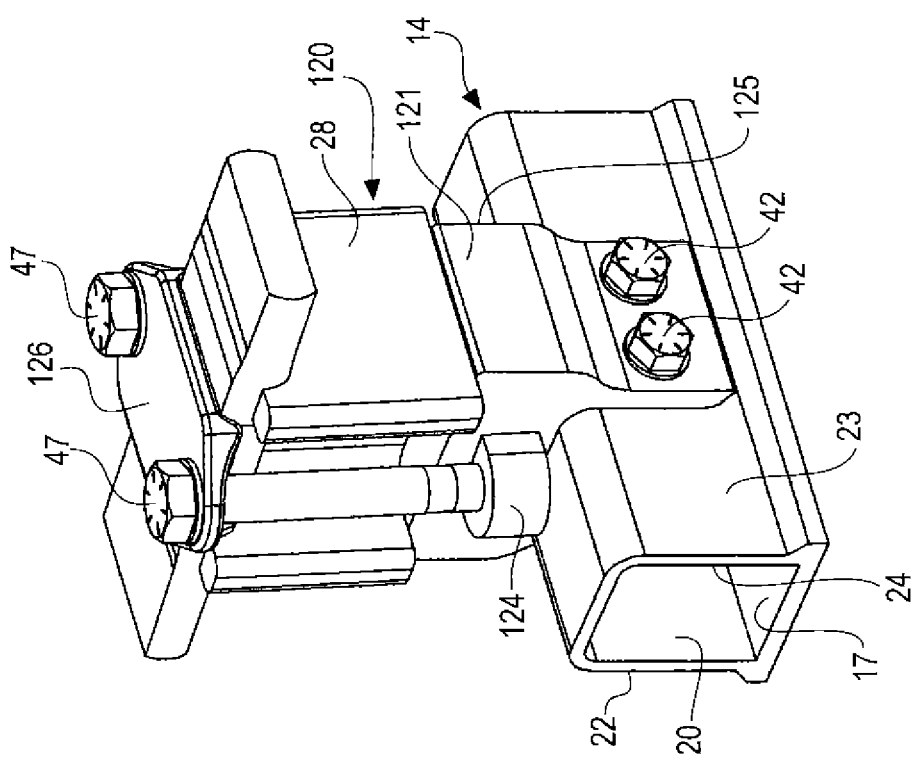
FIG. 27 is an upper perspective view showing a partial leaf spring and a further embodiment of the axle mounting assembly of the present disclosure wherein the axle seat bracket utilizes a single rectangularly-shaped bar pin and a pair of bolt fasteners.

A variation on the clamp assembly 110 of FIGS. 25 and 26 is shown in FIGS. 27 and 28 and generally designated by the reference numeral 120. In this embodiment, the modified axle seat bracket 121 has a bottom surface that engages the axle 14 and includes a relatively narrow but taller, flat-sided rectangular passageway 122 which overlies and is in parallel alignment with the axle 14. A correspondingly shaped and configured relatively thick bar pin 123 is received in the passageway to accommodate a preselected angle relative to the mounting pad and has its end portions 124 outwardly extending from the ends 125 of the modified axle seat bracket 121. Each of the end portions 124 of the bar pin 123 can include a threaded bore to receive and mate with a terminal portion of one of the two bolts 47, the head portions of which are in contact with the top clamping surface of a mounting plate 126. In this lighter weight axle mounting assembly, forces applied during installation and clamp-down of the bolts 47 are concentrated on the longitudinal center of the axle 14 with an axle seat or clamp-down area defined by the transverse width of the mounting plate 126.

Figure 29:
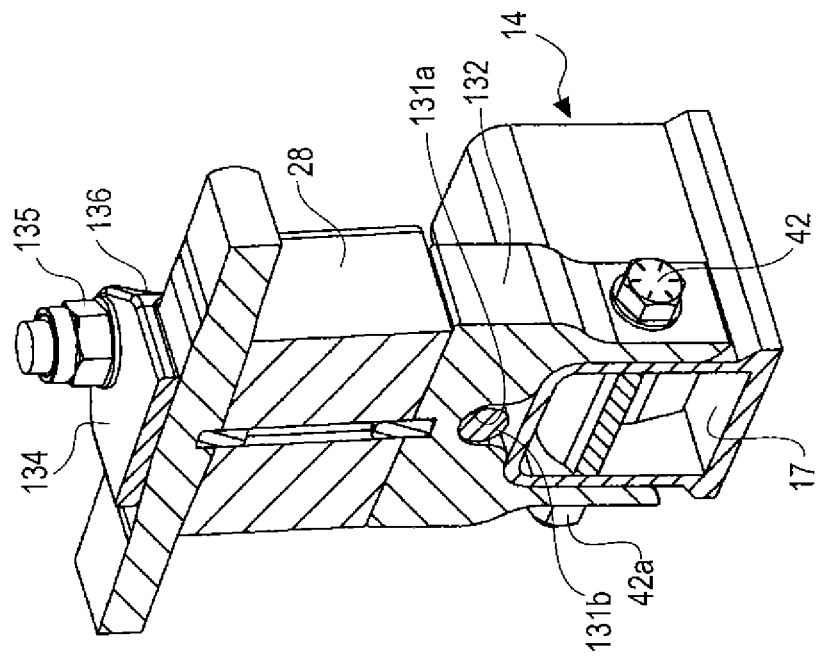
FIG. 29 is an upper perspective view of a partial leaf spring showing another embodiment of the axle mounting assembly of the present disclosure wherein the axle seat bracket utilizes a single captured U-bolt fastener.
Figure 30:
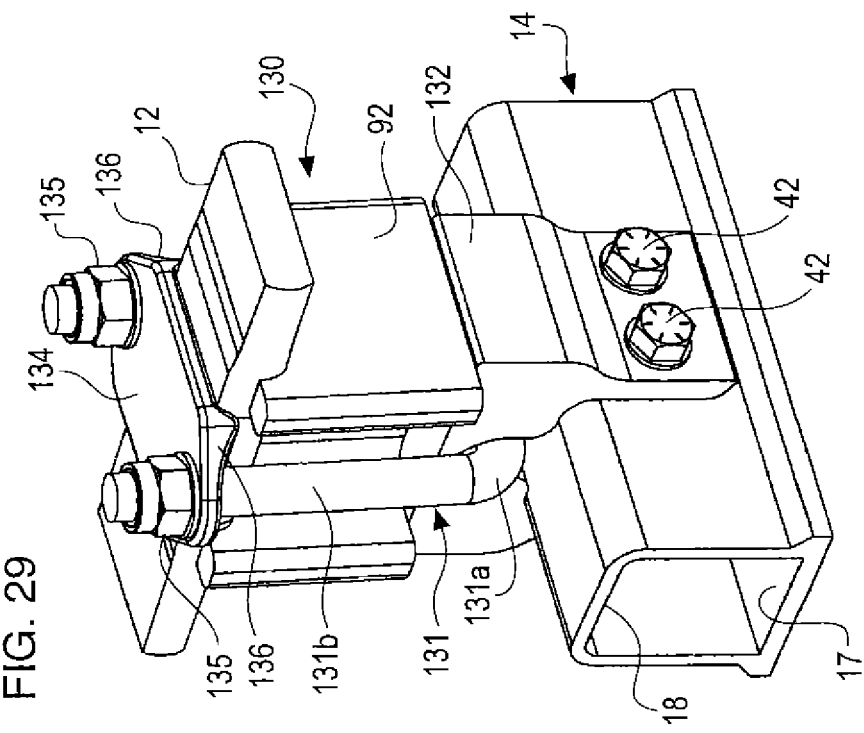
FIG. 30 is a cross-sectional perspective view of the axle mounting assembly shown in FIG. 29.

In FIGS. 29 and 30 the reference numeral 130 generally depicts a further embodiment of the present disclosure which utilizes a single U-shaped fastener assembly configured as a captured U-bolt 131 in place of the single rectangular bar pin 123 of the previously described axle mounting assembly 120. As shown, the axle mounting assembly 130 has a bottom surface that engages the axle 14 and includes a modified axle seat bracket 132 that has an elongated passage that is generally circular in cross-section extending therethrough in which the bight portion 131a of the U-bolt 131 is received. The legs 131b of the U-bolt 131 extend upwardly through a mounting pad 134 which provides a clamping surface which clamping nuts 135 engage to secure the entire assembly, accommodating a preselected caster or pinion angle within a lighter weight axle mounting assembly.

Figure 32:
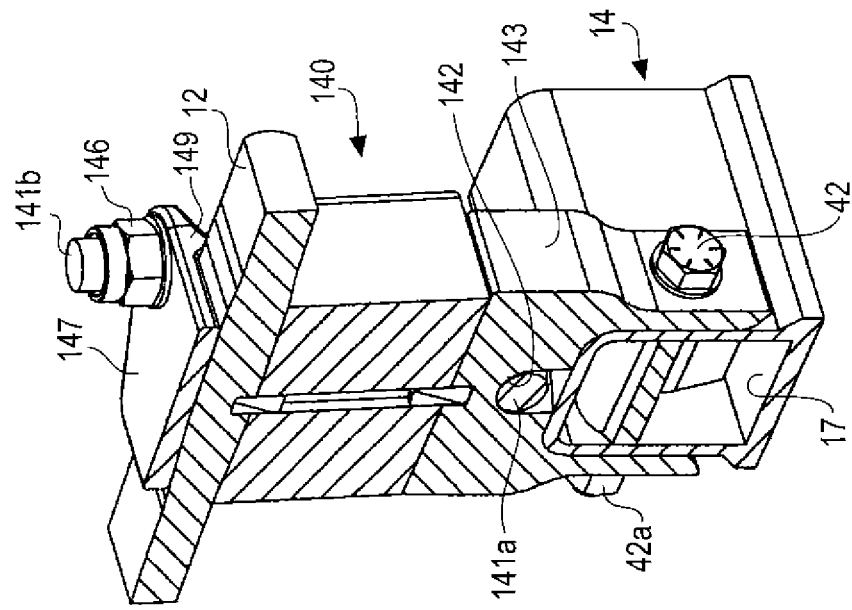
FIG. 32 is a cross-sectional perspective view of the axle mounting assembly shown in FIG. 31.
Figure 31:
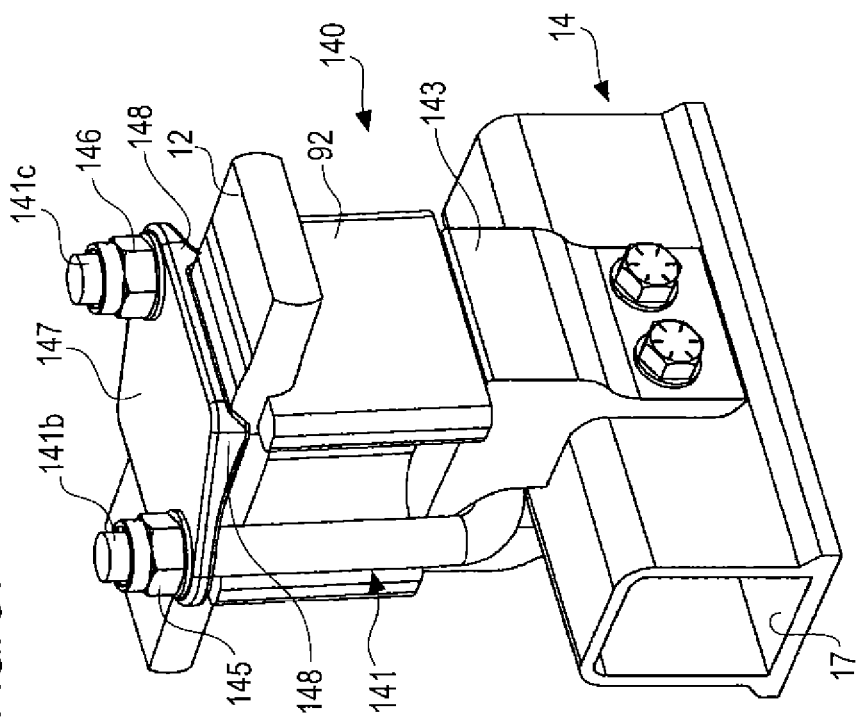
FIG. 31 is an upper perspective view of a partial leaf spring and a yet further embodiment of the present invention wherein the axle seat bracket utilizes a diagonally-oriented captured U-bolt.

FIGS. 31 and 32 depict an alternative axle mounting assembly 140 which is a variation of previously described axle mounting assembly 130. In this embodiment, a bight portion 141a of a U-bolt 141 is received in a diagonal passageway 142 that extends through the axle seat bracket 143, which has a bottom surface that engages the axle 14. The upstanding legs 141b and 141c of the U-bolt 141 are threadedly engaged to nuts 145 and 146 to clamp down the mounting pad 147 which overlies the leaf spring 12. Locating projections 148 extend downward from cover plate 147 and can be provided to engage the sides of leaf spring 12.

FIG. 33 illustrates the application of the clamp assembly of the present disclosure in an underslung trailing arm suspension generally designated by the reference numeral 150. As shown, an axle 151 is secured to an axle seat bracket 152 by a pair of bolts 153 and nuts (not shown) which extend through the sidewalls of the axle 151. The axle bracket 152 has a surface that engages the axle 151 and includes a pair of passageways 154 that receive U-shaped fastener assemblies that are similar to U-shaped fastener assemblies 45 of the axle mounting assembly 16. The U-shaped fastener assemblies include bar pins 155 (only one of which is fully visible) which are similar in design and construction to passages 44 and bar pins 46 of previously described axle mounting assembly 16 of the first embodiment. The bar pins 155 are connected to bolts 156 which couple the axle 151 to an energy-storing suspension component 158 that extends into an upturned eye 159 in which a bushing 159a is received for connection to a frame member (not shown).

Consistent with the design and construction of the axle seat bracket 30 of the first axle mounting assembly 16, the passages 154 and bar pins 155 in the axle seat bracket 152 are preferably spaced apart by a distance which is less than the width of the axle 151. In particular, as in the previously described embodiments, the longitudinal distance between adjacent bolts 156 is shortened and the axle seat or clamp-down area associated with the energy storing suspension component 158 is reduced, resulting in a lighter weight axle mounting assembly 150 that automatically rotates to accommodate a caster or pinion angle and an increase in the effective length of the suspension component 158.

Figure 34:
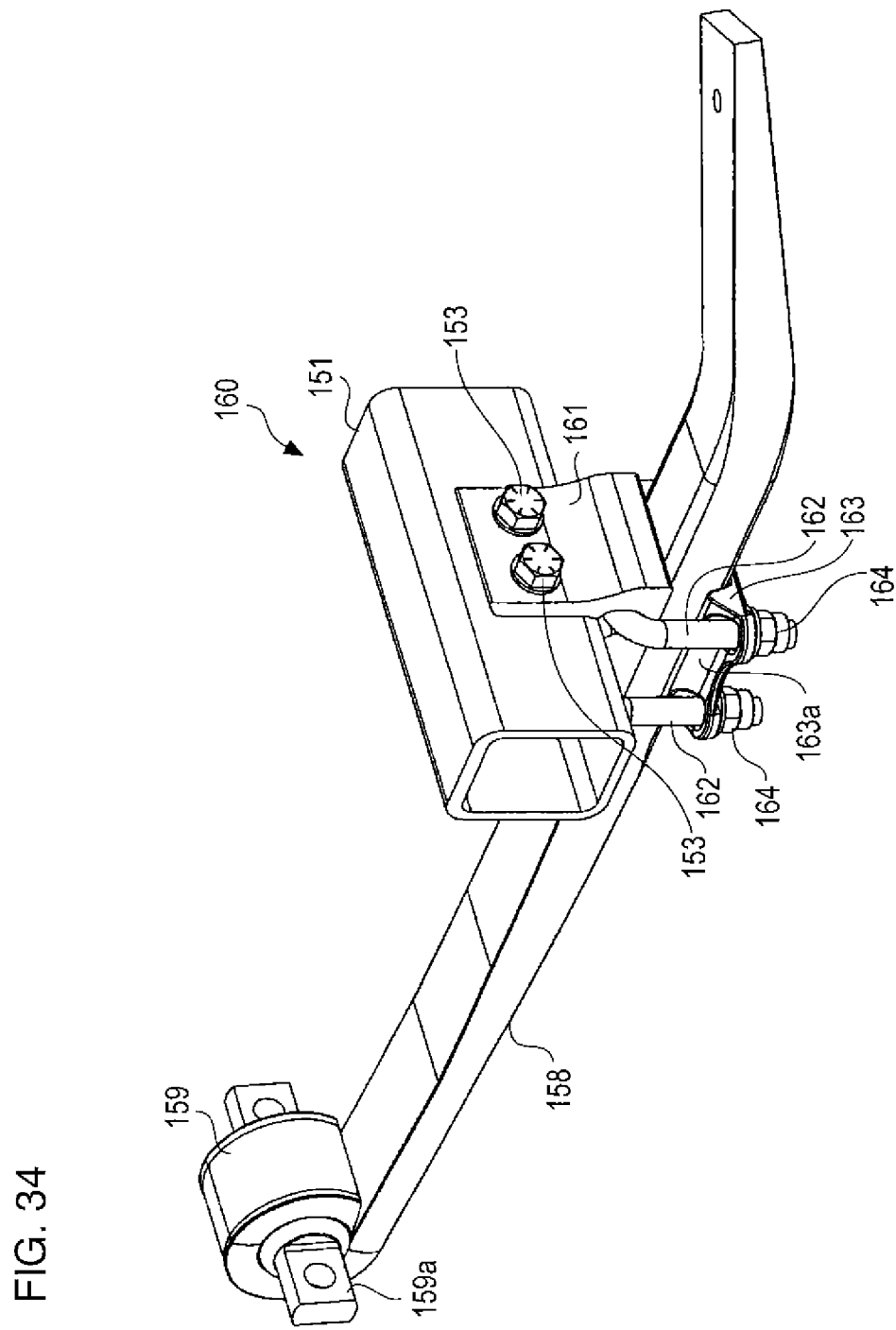
Figure 37:
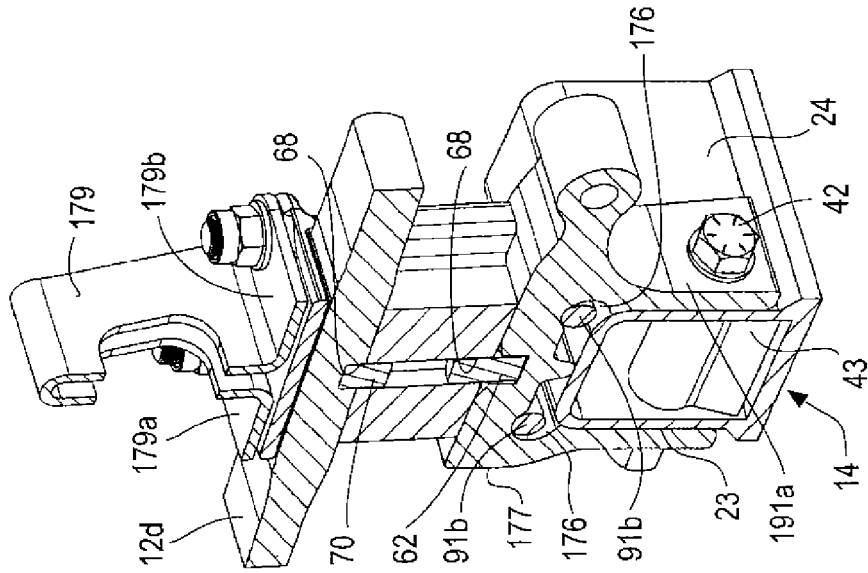
FIG. 37 is a cross-sectional perspective view through the center of the axle and axle mounting assembly shown in FIG. 36.
Figure 36:
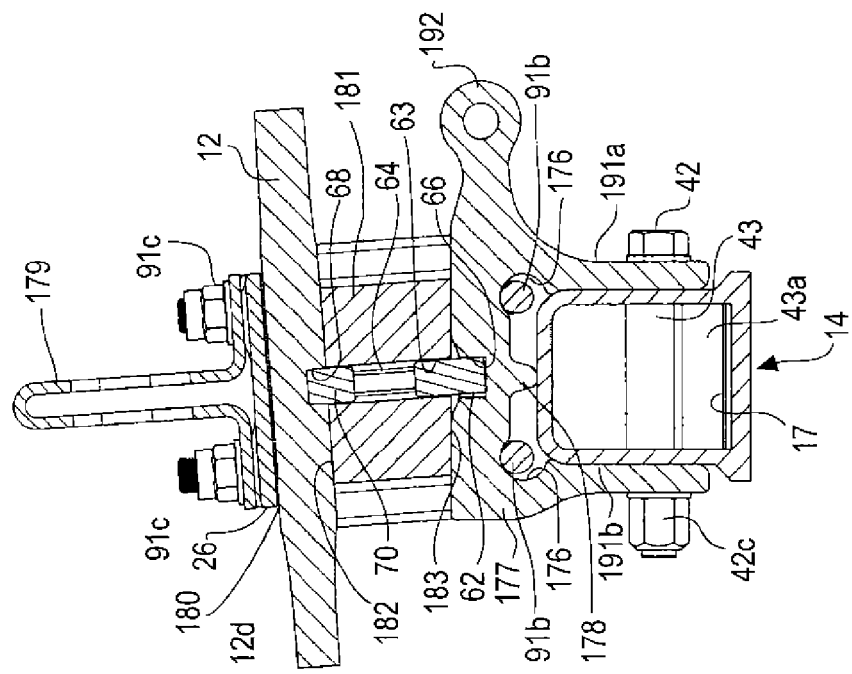
FIG. 36 is a side sectional view of a portion of the leaf spring and axle mounting assembly shown in FIG. 35.

FIG. 34 illustrates another axle mounting assembly of the present disclosure in an underslung trailing arm suspension generally designated by the reference numeral 160. As shown, the axle 151 is secured to an axle seat bracket 161 having a surface that engages the axle 151 and which utilizes a pair of U-shaped fastener assemblies that in this embodiment are shown as captured U-bolts 162 and clamping nuts 164, that wrap around the energy storing suspension component 158. The straight portions of the U-bolts extend through apertures in a mounting pad 163 with their end portions threadedly received in the clamping nuts 164. As was the case with the previously described embodiments, the U-shaped fastener assemblies are spaced apart by a distance which is less than the width of axle 151, resulting in the longitudinal distance between adjacent U-shaped fastener assemblies being shortened and producing a corresponding reduction weight of the axle mounting assembly 160 and in the axle seat or clamped-down area and an increase in the effective active length of the energy storing suspension component 158.

A further embodiment of the present invention is shown in FIGS. 35-39 and includes many of the same components previously described in the first embodiments. Accordingly, the same reference numerals and descriptions above with respect to the first example apply to those same components. This embodiment is designated by the reference numeral 175 and can be generally characterized as incorporating U-shaped fastener assemblies 91 like those shown and described in the embodiment of FIGS. 18-22. As was the case for the prior embodiments, the U-shaped fastener assemblies 91 are preferably spaced apart by a distance which is less than the width of the axle (i.e., less than the distance between the outside surfaces of the front facing axle wall 23 and rear facing axle wall 24.

As shown, the U-shaped fastener assemblies 91 are captured within parallel passages 176 of an axle seat bracket 177 and are at least partially in vertical alignment with the overall width of the top surface of axle 14. The axle seat bracket 177 has a bottom contacting member 178 that engages the axle 14.

Figure 38:
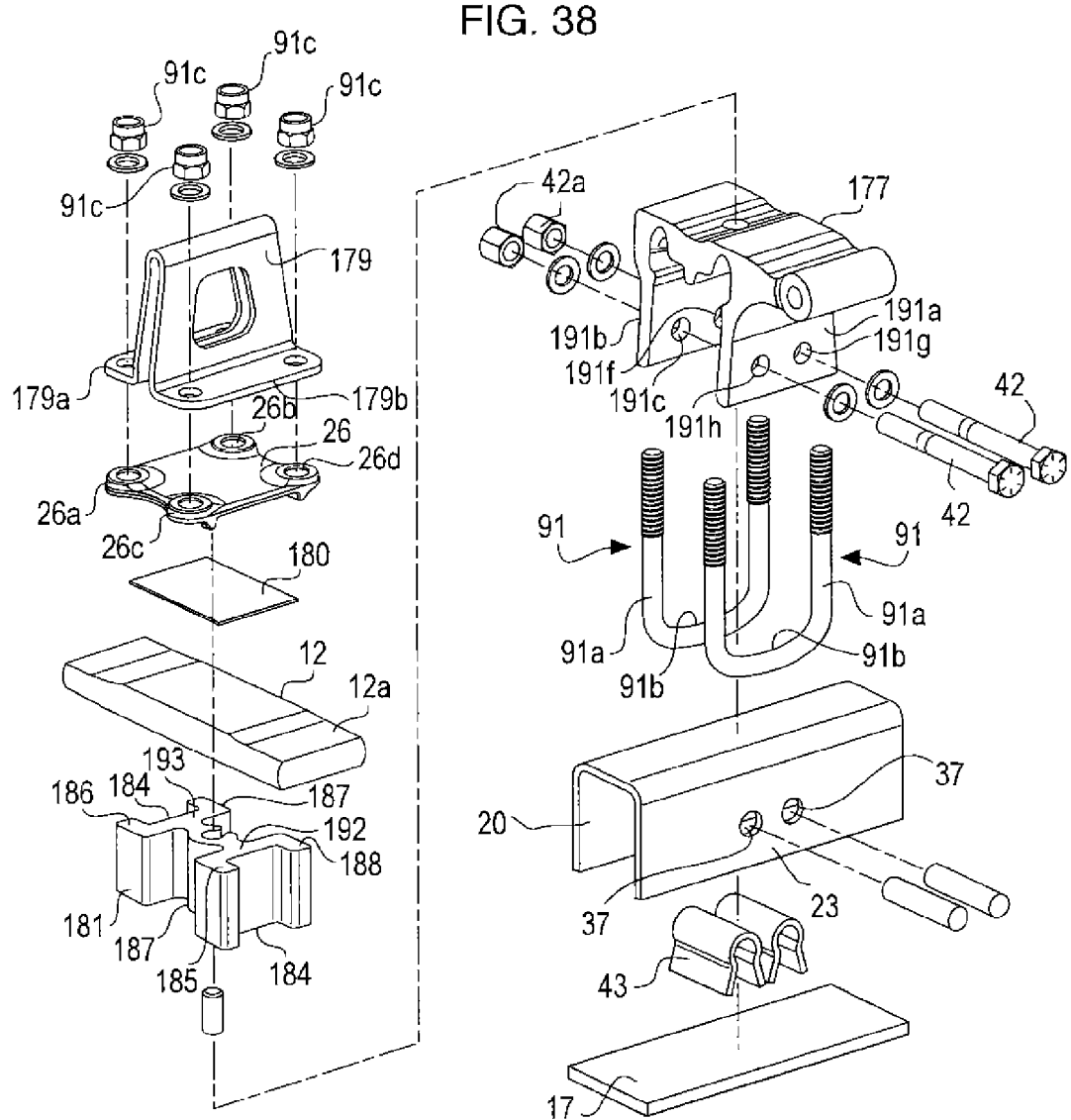
FIG. 38 is an exploded perspective view of the partial leaf spring and axle mounting assembly shown in FIGS. 35-37.

As best shown in FIG. 38, each of the U-shaped fastener assemblies 91 includes a U-bolt having an upwardly extending leg 91a which extends upwardly from a bight portion consisting of opposed arcuate segments and a straight segment. It will be appreciated that the precise configuration of this bight portion can vary in accordance with particular design considerations and that equivalent segments interconnecting the upwardly extending straight portions could be substituted in place thereof. The upwardly extending end portions of the straight sections 91a are threadedly received in nuts 91c.

A jounce stop 179 having flange portions 179a and 179b is mounted to the top mounting pad 26. As shown in FIG. 38, a deformable liner 180 can be provided between bottom surface of the mounting pad 26 and top surface 12a of leaf spring 12.

A spacer 181 of this embodiment is generally similar to the spacer 92 of the embodiment of FIGS. 18-22. As shown in FIG. 38, spacer 181 includes an upper surface 182 and a lower surface 183, as well as four cut-out portions each designated by reference numeral 184 which serve to reduce the weight of the spacer. Finger portions 185-188 are positioned to be in alignment with the edges of spring 12 and cross-members 189 and 190 are directly under and carry the U-bolt loads. As such, the spacer 181 provides a highly efficient, reduced weight component for this embodiment of the clamp group.

In this illustrated embodiment, the top surface 182 of spacer 181 includes a caster or pinion angle which engages the lower surface 12a of the leaf spring 12 which can be provided by machining the extruded spacer body. It will be appreciated that a fixed caster or pinion angle could be provided by including an additional wedge component (not shown) or could be built into the axle seat bracket 177. In either event, as the nuts 91c are installed and tightened, the U-shaped fastener assemblies 91 rotate to accommodate nut face angularity while reducing axle mounting assembly weight.

Figure 39:
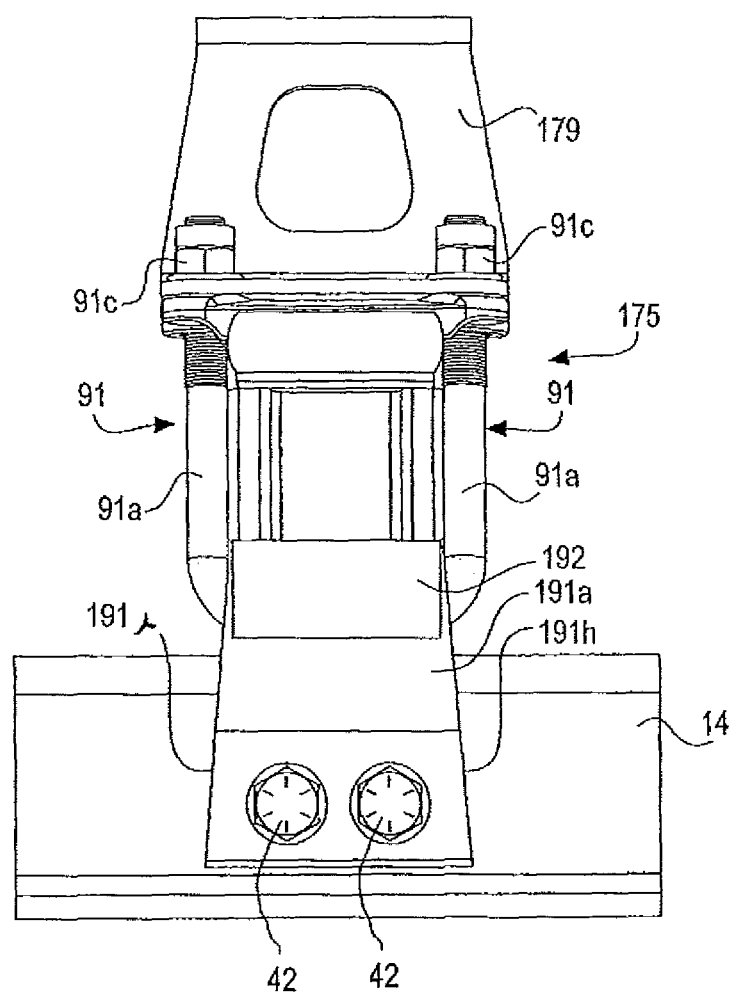
FIG. 39 is a rear elevational view of the axle mounting assembly shown in FIG. 35-38.

In accordance with an important aspect of this embodiment, the axle seat bracket 177 includes downwardly extending flanges 191a and 191b that are designed to provide the requisite strength for the area surrounding the through-bolt holes 191c-f in the axle 18 without unnecessary additional weight and machining to the other parts of the bracket 177. As best shown in FIG. 39, downwardly extending flange 191a (duplicated in flange 191b) side edges 191g ' and h' are angled inwardly from their base to their upper extent which, in the illustrated embodiment, includes a shock bracket 192. As such, this design feature results in a greater amount of material surrounding the through holes 191h-g in flange 191a and the holes 191c and 191f in flange 191b where greater strength is needed and less weight at the portions of bracket 177 above the through-holes.

While the invention of this disclosure has been described with illustrative examples, it will be appreciated that modifications and/or changes may be made by those skilled in the art without departing from the spirit and scope of the invention as defined by the appended claims.

The invention claimed is:

1. An axle mounting assembly for coupling a vehicle axle to an energy storing suspension component comprising:
   a mounting pad;
   a longitudinally extending energy storing suspension component vertically aligned with respect to said mounting pad;
   an axle seat bracket configured to be coupled to a vehicle axle adjacent at least one surface of the axle bracket that is vertically aligned with, and spaced from, said mounting pad;
   a transverse axle mounted to said axle seat bracket;
   at least one horizontally aligned open passage extending through said axle seat bracket in parallel relation to said axle and at least partially disposed between said energy storing suspension component and the at least one surface of the axle seat bracket;
   at least one U-shaped fastener assembly coupled to said mounting pad, said U-shaped fastener assembly being partially disposed within said passage and having end portions extending outwardly therefrom.

2. The axle mounting assembly of claim 1 wherein said at least one U-shaped fastener assembly comprises a bar pin having opposed ends extending outwardly from said at least one passage.

3. The axle mounting assembly of claim 2 wherein said bar pin is rotatably received within said at least one passage of said axle bracket.

4. The axle mounting assembly of claim 1 wherein said at least one U-shaped fastener assembly is coupled to said mounting pad by spaced-apart bolt fasteners.

5. The axle mounting assembly of claim 4 wherein the at least one U-shaped fastener assembly pivots about an axis of said at least one passage to maintain the respective clamping surfaces of said bolt fasteners and mounting pad in parallel.

6. The axle mounting assembly of claim 1 which includes a caster or pinion angle between the longitudinal axis of said elongated energy storing suspension component and said axle.

7. The axle mounting assembly of claim 1 wherein a spacer is located between said energy storing suspension component and said axle seat bracket.

8. The axle mounting assembly of claim 7 wherein a surface of said spacer which is in contact with said energy storing suspension component has a planar angle that corresponds to a desired caster or pinion angle.

9. The axle mounting assembly of claim 1 wherein said energy storing suspension component is a leaf spring.

10. An axle mounting assembly for coupling a vehicle axle to an energy storing suspension component comprising:
    a mounting pad;
    a longitudinally extending energy storing suspension component vertically aligned with respect to said mounting pad;
    an axle seat bracket configured to be coupled to a vehicle axle adjacent at least one surface of the axle bracket that is vertically aligned with, and spaced from, said mounting pad;
    a transverse axle mounted to said axle seat bracket;
    at least one horizontally aligned open passage extending through said axle seat bracket in parallel relation to said axle and at least partially disposed between said energy storing suspension component and the at least one surface of the axle seat bracket;
    one U-shaped fastener assembly coupled to said mounting pad, said U-shaped fastener assembly being partially disposed within said passage and having end portions extending outwardly therefrom;
    said U-shaped fastener assembly comprising a U-bolt.

11. The axle mounting assembly of claim 1 wherein said axle seat bracket includes a pair of flanges that wrap around said axle, a bolt assembly extending through each said flange and axle, each of said flanges having spaced-apart lateral edges, at least one of said edges being inwardly angled.

12. The axle mounting assembly of claim 7 wherein said spacer, an upper surface which includes a pair of integral fingers at the opposed ends thereof which are in alignment with the edge portions of said leaf spring and a pair of integral cross-members which are under and in alignment with said U-shaped fastener assemblies.

13. An axle mounting assembly for coupling a leaf spring to a vehicle axle comprising:
a mounting pad overlying a leaf spring, said mounting pad having spaced-apart fore and aft mounting holes;
bolt fasteners extending through said mounting pad, said bolt fasteners having a head and a cylindrical body which terminates in a threaded distal end, the bottom surface of each of said bolt heads being in parallel intimate contact with the upper surface of said top pad surrounding the bolt fastener cylindrical body;
an axle seat bracket having a bottom surface defining an axle seat configured to conform to an upper surface of a transverse axle which is received in said axle seat bracket, said axle seat bracket including a pair of transverse cylindrical passages extending therethrough;
a pair of bar pins received in said passages, opposite end portions of said bar pins having bores which are in alignment with and configured to receive the threaded distal ends of said bolt fasteners, and
said leaf spring having a given width and said fore mounting holes being spaced from said aft mounting holes by a longitudinal distance which is less than said given width of said leaf spring.

14. The axle mounting assembly of claim 13 which includes a spacer underlying said leaf spring, an upper surface of said spacer having upwardly extending fore and aft posts configured to engagingly receive the bottom portion and sides of said leaf spring, said spacer including opposed sidewalls between said fore and aft posts which are spaced inwardly of the sides of said leaf spring that overlies the spacer.

15. The axle mounting assembly of claim 13 wherein a top surface of said spacer has a planar angle which corresponds to a desired caster or pinion angle for the leaf spring when installed in a suspension system.

16. The axle mounting assembly of claim 13 wherein the bar pins and passages in said axle bracket are configured to permit the bar pins to rotate in the passages of said axle bracket.

17. The axle mounting assembly of claim 13 wherein said axle seat bracket includes a pair of flanges that wrap around said axle, a bolt assembly extending through each said flange and axle, each of said flanges having spaced-apart lateral edges, at least one of said edges being inwardly angled.

18. The axle mounting assembly of claim 14, said spacer includes an upper surface which includes a pair of integral fingers at the opposed ends thereof which are in alignment with the edge portions of said leaf spring and a pair of integral cross-members which are under and in substantial alignment with said bar pins.

19. An axle mounting assembly for coupling a vehicle axle to a suspension component comprising:
an axle seat bracket configured to be coupled to a vehicle axle adjacent at least one surface of the axle seat bracket;
a mounting pad spaced from the axle seat bracket;
a suspension component having a longitudinal axis and being disposed between the axle seat bracket and the mounting pad;
wherein the axle seat bracket includes at least two passages that are parallel to each other, that extend perpendicularly to the longitudinal axis of the suspension component and that are at least partially disposed between the suspension component and the at least one surface of the axle seat bracket;
at least two U-shaped fastener assemblies, wherein each U-shaped fastener assembly is coupled to the mounting pad and has a portion disposed within one of the passages.

20. The axle mounting assembly of claim 19 wherein each U-shaped fastener assembly further comprises a bar pin having opposed ends extending outwardly from one of the respective passages.

21. The axle mounting assembly of claim 20 wherein each bar pin further comprises a central portion having a circular cross-section.

22. The axle mounting assembly of claim 21 wherein each passage includes at least a portion that is generally cylindrically-shaped and rotatably engaged by one of the respective bar pins.

23. The axle mounting assembly of claim 20 wherein each bar pin further comprises a central portion having a non-circular cross-section.

24. The axle mounting assembly of claim 23 wherein each passage has a shape that corresponds to and slidably receives one of the respective bar pins.

25. The axle mounting assembly of claim 19 wherein each U-shaped fastener assembly further comprises a pair of bolts.

26. The axle mounting assembly of claim 20 wherein each end of a respective bar pin further comprises a bore.

27. The axle mounting assembly of claim 26 wherein each bore is threaded.

28. The axle mounting assembly of claim 19 wherein each U-shaped fastener assembly further comprises a U-shaped bolt having a bight portion that extends through a respective passage in the axle seat bracket and a pair of legs that extend through the mounting pad.

29. The axle mounting assembly of claim 28 wherein the bight portion of each U-shaped bolt has a cylindrical cross-section that rotatably engages one of the passages.

30. The axle mounting assembly of claim 19 wherein said axle seat bracket includes a pair of flanges that wrap around said axle, a bolt assembly extending through said flange and axle, each of said flanges having spaced-apart lateral edges, at least one of said edges being inwardly angled.

31. A method of automatically adjusting for a caster or pinion angle in an axle mounting assembly for coupling a vehicle axle to a suspension component comprising:
providing an axle seat bracket configured to be coupled to a vehicle axle and including at least two parallel passages extending therethrough;
providing a mounting pad spaced from the axle seat bracket;
providing a suspension component having a longitudinal axis that is perpendicular to the passages and that is disposed between the axle seat bracket and the mounting pad;
providing at least two U-shaped fastener assemblies, wherein each U-shaped fastener assembly engages the mounting pad and has a portion disposed within one of the respective passages;
and wherein when the respective U-shaped fastener assemblies are being installed, the U-shaped fastener assemblies automatically rotate and accommodate a caster or pinion angle within the axle mounting assembly.

32. The method of automatically adjusting for a caster or pinion angle in an axle mounting assembly claim 31 wherein each U-shaped fastener assembly further comprises a bar pin having opposed ends extending outward from a respective passage.

33. The method of automatically adjusting for a caster or pinion angle in an axle mounting assembly of claim 32 wherein each bar pin further comprises a central portion having a circular cross-section.

34. The method of automatically adjusting for a caster or pinion angle in an axle mounting assembly of claim 33 wherein each passage includes at least a portion that is generally cylindrically-shaped and the respective bar pin rotatably engages the passage.

35. The method of automatically adjusting for a caster or pinion angle in an axle mounting assembly of claim 31 wherein each U-shaped fastener assembly further comprises a pair of bolts.

36. The method of automatically adjusting for a caster or pinion angle in an axle mounting assembly of claim 35 wherein each end of the respective bar pin further comprises a bore.

37. The method of automatically adjusting for a caster or pinion angle in an axle mounting assembly of claim 36 wherein each bore is threaded.

38. The method of automatically adjusting for a caster or pinion angle in an axle mounting assembly of claim 31 wherein each U-shaped fastener assembly further comprises a U-shaped bolt having a bight portion that extends through a respective passage in the axle seat bracket and a pair of legs that extend through the mounting pad.

\* \* \* \* \*